US012093708B2

(12) United States Patent
Tian et al.

(10) Patent No.: US 12,093,708 B2
(45) Date of Patent: Sep. 17, 2024

(54) VIRTUAL MACHINE SCHEDULING METHOD AND APPARATUS

(71) Applicant: Alibaba Group Holding Limited, Grand Cayman (KY)

(72) Inventors: Zhengxiong Tian, Hangzhou (CN); Haihong Xu, Hangzhou (CN); Bo Zhu, Beijing (CN); Junjie Cai, Sunnyvale, CA (US)

(73) Assignee: Alibaba Group Holding Limited, George Town (KY)

( * ) Notice: Subject to any disclaimer, the term of this patent is extended or adjusted under 35 U.S.C. 154(b) by 821 days.

(21) Appl. No.: 17/066,328

(22) Filed: Oct. 8, 2020

(65) Prior Publication Data
US 2021/0034407 A1    Feb. 4, 2021

Related U.S. Application Data

(63) Continuation of application No. PCT/CN2019/080803, filed on Apr. 1, 2019.

(30) Foreign Application Priority Data

Apr. 9, 2018  (CN) .......................... 201810312074.7

(51) Int. Cl.
G06F 9/455       (2018.01)
G06F 9/48        (2006.01)
G06N 20/00       (2019.01)

(52) U.S. Cl.
CPC ........ *G06F 9/45558* (2013.01); *G06F 9/4856* (2013.01); *G06N 20/00* (2019.01); *G06F 2009/4557* (2013.01)

(58) Field of Classification Search
CPC ............... G06F 9/45558; G06F 9/4856; G06F 2009/4557
See application file for complete search history.

(56) References Cited

U.S. PATENT DOCUMENTS 7,251,815 B2   7/2007   Donovan et al.
8,145,760 B2   3/2012   Dinda et al.
(Continued)

FOREIGN PATENT DOCUMENTS

CN    102236582 A    11/2011
CN    103885831 A    6/2014
(Continued)

OTHER PUBLICATIONS

Translated Japanese Office Action mailed Feb. 21, 2023, for Japanese patent application No. 2020-555183, a foreign counterpart of U.S. Appl. No. 17/066,328, 6 pages.
(Continued)

*Primary Examiner* — Lewis A Bullock, Jr.
*Assistant Examiner* — Kevin X Lu
(74) *Attorney, Agent, or Firm* — Lee & Hayes, P.C.

(57) ABSTRACT

A method and an apparatus for scheduling a virtual machine are disclosed in. The method includes predicting resource data required by a virtual machine in a next time period to obtain a prediction result; obtaining used resource data and available resource data of candidate host machines; adding the prediction result to used resource data of each candidate host machine to obtain a superimposition result of each candidate host machine; and separately comparing the superimposition result of each candidate host machine with available resource data of each host machine, and selecting a target host machine corresponding to the virtual machine from the candidate host machines. The present disclosure solves the technical problem of a large waste of resources caused by the needs of a host machine to reserve resources for respective peaks of each virtual machine in the existing technologies.

20 Claims, 8 Drawing Sheets

(56) References Cited

U.S. PATENT DOCUMENTS

| | | | |
|---|---|---|---|
| 8,424,007 | B1 | 4/2013 | Hernacki et al. |
| 8,881,150 | B2 | 11/2014 | Sawa et al. |
| 8,918,788 | B2 | 12/2014 | Grouzdev |
| 8,924,961 | B2 | 12/2014 | Radhakrishnan et al. |
| 9,152,443 | B2 | 10/2015 | Neuse et al. |
| 9,417,912 | B2 | 8/2016 | Suh et al. |
| 9,846,590 | B2 * | 12/2017 | Chen .................. G06F 9/45533 |
| 10,452,417 | B2 | 10/2019 | Serebrin et al. |
| 10,909,503 | B1 * | 2/2021 | Dias ........................ G06N 20/00 |
| 10,938,587 | B2 * | 3/2021 | Griffin ................ H04L 12/1818 |
| 11,748,610 | B1 * | 9/2023 | Majumder ............... G06N 3/10 706/12 |
| 2012/0036515 | A1 * | 2/2012 | Heim .................... G06F 9/5088 718/105 |
| 2014/0189684 | A1 | 7/2014 | Zaslavsky et al. |
| 2015/0007178 | A1 | 1/2015 | Kaneko et al. |
| 2015/0236975 | A1 * | 8/2015 | Saito ...................... H04L 67/10 709/226 |
| 2015/0317179 | A1 | 11/2015 | Fahrig |
| 2016/0162308 | A1 | 6/2016 | Chen |
| 2017/0075709 | A1 | 3/2017 | Feng et al. |
| 2017/0344448 | A1 * | 11/2017 | Agha .................. G06F 11/2242 |
| 2018/0157519 | A1 | 6/2018 | Fahrig |
| 2019/0213068 | A1 * | 7/2019 | Upadhyay ............... G06F 11/30 |
| 2019/0342181 | A1 * | 11/2019 | Li ........................ H04L 41/142 |
| 2020/0034167 | A1 * | 1/2020 | Parthasarathy ..... G06F 9/45558 |
| 2020/0042338 | A1 * | 2/2020 | Poothia ................. G06F 12/023 |
| 2021/0044112 | A1 * | 2/2021 | Takeuchi ................ H02J 3/144 |
| 2021/0117869 | A1 * | 4/2021 | Plumbley .............. G06F 18/217 |
| 2021/0342193 | A1 * | 11/2021 | Anand ................ G06F 11/3447 |
| 2022/0091874 | A1 * | 3/2022 | Janakiram ............ G06F 9/4856 |

FOREIGN PATENT DOCUMENTS

| | | |
|---|---|---|
| CN | 104424013 A | 3/2015 |
| CN | 105378667 A | 3/2016 |
| CN | 105893113 A | 8/2016 |
| CN | 106933649 A | 7/2017 |
| CN | 107038064 A | 8/2017 |
| WO | WO2015139374 A1 | 9/2015 |

OTHER PUBLICATIONS

Translation of Chinese Office Action, mailed Nov. 18, 2022, from corresponding 201810312074.7, 5 pages.

Translation of Chinese Search Report, mailed Nov. 14, 2022, from corresponding 201810312074.7, 2 pages.

Translation of International Search Report, malled Jun. 28, 2019, from corresponding PCT/CN2019/080803, 2 pages.

Translation of Written Opinion, mailed Jun. 28, 2019, from corresponding PCT/CN2019/080803, 4 pages.

Extended European Search Report mailed Nov. 17, 2021 for European Patent Application No. 19784797.3, 7 pages.

* cited by examiner

VIRTUAL MACHINE SCHEDULING METHOD AND APPARATUS

CROSS REFERENCE TO RELATED PATENT APPLICATIONS

This application claims priority to and is a continuation of PCT Patent Application No. PCT/CN2019/080803 filed on 1 Apr. 2019, and is related to and claims priority to Chinese Application No. 201810312074.7, filed on 9 Apr. 2018 and entitled "Virtual Machine Scheduling Method and Apparatus," which are hereby incorporated by reference in their entirety.

TECHNICAL FIELD

The present disclosure relates to the field of cloud computing, and particularly to virtual machine scheduling methods and apparatuses.

BACKGROUND

A virtual machine refers to a complete computer system with complete hardware system functions that is simulated by software and runs in a completely isolated environment. When creating a virtual machine, a scheduling system needs to classify a host machine for the virtual machine. After the virtual machine is created, the host machine on which the virtual machine is run can be changed. Such processes of assigning a host machine and processes of changing a host machine are processes of scheduling a virtual machine.

At present, cloud computing scheduling in the industry usually uses different methods for performing a hybrid scheduling of sensitive services and batch jobs to reduce mutual influence. Categories to which applications belong are classified using user images: computation-intensive, cache-intensive, and memory-intensive, so as to formulate different scheduling strategies for different types of virtual machines.

However, existing hybrid scheduling schemes are based on a premise that batch processing applications can reduce priority levels, and a level is downgraded in time when a problem is encountered. However, virtual machine scheduling does not have priority levels. Virtual machines are created with the same priority level. Any migration has a certain impact on users, so a host machine needs to reserve resources for respective peaks of each virtual machine, which will inevitably cause a large waste of resources.

A host machine in existing technologies needs to reserve resources for respective peaks of each virtual machine, which leads to the problem of large resource waste. Currently, no effective solution has been proposed.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Embodiments of the present disclosure provide a method and an apparatus for scheduling a virtual machine, so as to at least solve the technical problem of a large waste of resources caused by the needs of a host machine to reserve resources for respective peaks of each virtual machine in the existing technologies.

According to the embodiments of the present disclosure, a virtual machine scheduling method is provided, which includes: predicting resource data required by a virtual machine in a next time period to obtain a prediction result, wherein the resource data includes at least one of the following: processor resources, a number of times of processor contention, a number of cache misses, and a utilization rate of power consumption; obtaining used resource data and available resource data of candidate host machines; adding the prediction result to used resource data of each candidate host machine to obtain a superimposition result of each candidate host machine; and separately comparing the superimposition result of each candidate host machine with available resource data of each host machine, and selecting a target host machine corresponding to the virtual machine from the candidate host machines.

According to the embodiments of the present disclosure, a virtual machine scheduling method is also provided, which includes: predicting processor resources required by a virtual machine in a next time period to obtain a prediction result; obtaining used processor resources and available processor resources of candidate host machines; adding the prediction result to used processor resources of each candidate host machine to obtain a superimposition result of each candidate host machine; and separately comparing the superimposition result of each candidate host machine with available processor resources of each candidate host machine, and selecting a target host machine corresponding to the virtual machine from the candidate host machines.

According to the embodiments of the present disclosure, a virtual machine scheduling apparatus is also provided, which includes: a prediction module configured to predict resource data required by a virtual machine in a next time period to obtain a prediction result, wherein the resource data includes at least one of the following: processor resources, a number of times of processor contentions, a number of cache misses, and a utilization rate of power consumption; an acquisition module configured to obtain used resource data and available resource data of candidate host machines; a superimposition module configured to add the prediction result to resource data of each candidate host machine to obtain a superimposition result of each candidate host machine; and a comparison module configured to separately compare the superimposition result of each candidate host machine with available resource data of each host machine, and select a target host machine corresponding to the virtual machine from the candidate host machines.

According to the embodiments of the present disclosure, a virtual machine scheduling apparatus is also provided, which includes: a prediction module configured to predict processor resources required by a virtual machine in a next time period to obtain a prediction result; an acquisition module configured to obtain used processor resources and available processor resources of candidate host machines; a superposition module configured to add the prediction result to used processor resources of each candidate host machine to obtain a superimposition result of each candidate host machine; and a comparison module configured to compare the superimposition result of each candidate host machine with available processor resources of each candidate host machine, and select a target host machine corresponding to the virtual machine from the candidate host machines.

According to the embodiments of the present disclosure, a storage medium is also provided. The storage medium includes a stored program, wherein a device where the storage medium is located is controlled to perform the following steps when the program is running: predicting resource data required by a virtual machine in a next time period to obtain a prediction result, wherein the resource data includes at least one of the following: processor resources, a number of times of processor contention, a number of cache misses, and a utilization rate of power consumption; obtaining used resource data and available resource data of candidate host machines; adding the prediction result to used resource data of each candidate host machine to obtain a superimposition result of each candidate host machine; and separately comparing the superimposition result of each candidate host machine with available resource data of each host machine, and selecting a target host machine corresponding to the virtual machine from the candidate host machines.

According to the embodiments of the present disclosure, a processor is also provided. The processor is used to run a program, wherein the following steps are executed when the program is running: predicting resource data required by a virtual machine in a next time period to obtain a prediction result, wherein the resource data includes at least one of the following: processor resources, a number of times of processor contention, a number of cache misses, and a utilization rate of power consumption; obtaining used resource data and available resource data of candidate host machines; adding the prediction result to used resource data of each candidate host machine to obtain a superimposition result of each candidate host machine; and separately comparing the superimposition result of each candidate host machine with available resource data of each host machine, and selecting a target host machine corresponding to the virtual machine from the candidate host machines.

According to the embodiments of the present disclosure, a system is also provided, which includes: a processor; and a memory coupled to the processor, and configured to provide the processor with instructions for processing the following processing steps: predicting resource data required by a virtual machine in a next time period to obtain a prediction result, wherein the resource data includes at least one of the following: processor resources, a number of times of processor contention, a number of cache misses, and a utilization rate of power consumption; obtaining used resource data and available resource data of candidate host machines; adding the prediction result to used resource data of each candidate host machine to obtain a superimposition result of each candidate host machine; and separately comparing the superimposition result of each candidate host machine with available resource data of each host machine, and selecting a target host machine corresponding to the virtual machine from the candidate host machines.

In the embodiments of the present disclosure, resource data used by a virtual machine in a future cycle is scheduled through prediction. Also, which candidate host machine a virtual machine needs to be migrated to, i.e., a target host machine, is determined by using currently used resource data and available resource data of candidate host machines that are obtained. As such, a host machine can be selected more accurately for the virtual machine without requiring each host machine to reserve resources for respective peaks of each virtual machine, thus reducing a waste of resources and placing virtual machines as evenly distributed as possible on different host machines to achieve stable load balancing of physical machines.

Therefore, the above-mentioned embodiments of the present disclosure solve the technical problem that a host machine needs to reserve resources for respective peaks of each virtual machine in the existing technologies, which leads to a large waste of resources.

BRIEF DESCRIPTION OF THE DRAWINGS

The accompanying drawings described herein are used to provide a further understanding of the present disclosure, and constitute a part of the present disclosure. Exemplary embodiments of the present disclosure and descriptions thereof are used to explain the present disclosure, and do not constitute improper limitations of the present disclosure. In the accompanying drawings.

DETAILED DESCRIPTION

In order to enable one skilled in the art to better understand the solutions of the present disclosure, the technical solutions in the embodiments of the present disclosure will be described clearly and completely with reference to the accompanying drawings in the embodiments of the present disclosure. Apparently, the described embodiments represent merely a part and not all of the embodiments of the present disclosure. Based on the embodiments of the present disclosure, all other embodiments obtained by one of ordinary skill in the art without making any creative effort shall fall within the scope of protection of the present disclosure.

It should be noted that terms "first" and "second", etc., in the description of the present disclosure and the aforementioned drawings are used to distinguish similar objects, and not necessarily used to describe a specific order or sequence. It should be understood that data used in this way can be interchanged under appropriate situations, so that the embodiments of the present disclosure described herein can be implemented in an order other than those illustrated or described herein. In addition, terms "containing", "having", and any variations thereof are intended to cover non-exclusive inclusions. For example, a process, method, system, product or device that includes a series of steps or units is not necessarily limited to those explicitly listed steps or units, and may include other steps or units that are not explicitly listed or that are inherent to such process, method, system, product or device.

First of all, some nouns or terms that appear in a process of describing the embodiments of the present disclosure are suitable for the following interpretations:

Virtual machine: Refers to a complete computer system with complete hardware system functions that is simulated by software and runs in a completely isolated environment.

Virtual machine (VM) scheduling: When creating a virtual machine, a scheduling system needs to classify a host machine for the virtual machine, and the host machine on which the virtual machine is run can be changed after the virtual machine is created. A process of assigning a host machine and a process of changing a host machine is a process of scheduling a virtual machine.

According to the embodiments of the present disclosure, an embodiment of a method for scheduling a virtual machine is also provided. It needs to be noted that steps shown in a flowchart of the accompanying drawings can be executed in a computer system such as a set of computer executable instructions. Also, although a logical order is shown in the flowchart, in some cases, the steps may be performed in a order different from the one shown or described herein.

Figure 1:
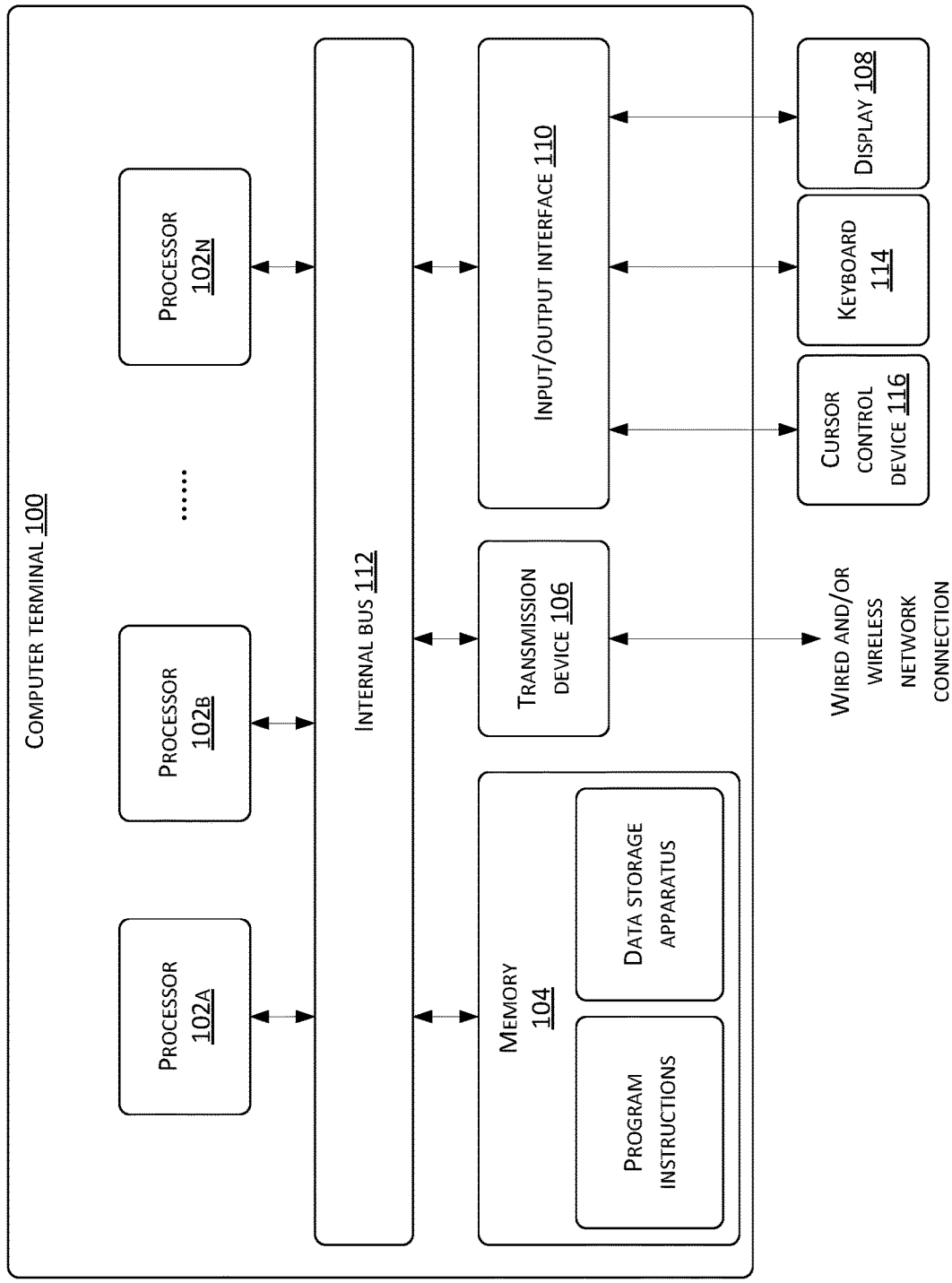
FIG. 1 shows a block diagram of a hardware structure of a computer terminal (or a mobile device) used to implement a virtual machine scheduling method.

The method embodiment provided in the embodiments of the present disclosure may be executed in a mobile terminal, a computer terminal or a similar computing device. FIG. 1 shows a block diagram of the hardware structure of a computer terminal (or a mobile device) used to implement a virtual machine scheduling method. As shown in FIG. 1, a computer terminal 100 (or a mobile device 100) may include one or more (shown as 102a, 102b, . . . , 102n in the figure) processors 102 (the processor 102 may include, but is not limited to, a processing device such as a micro-processor MCU or a programmable logic device FPGA), a memory 104 used for storing data, and a transmission device 106 used for communication functions. In addition, a display 108, an input/output interface (I/O interface) 110, a universal serial bus (USB) port 112 (which may be included as one of the ports of I/O interface), a keyboard 114, a cursor control device 116, etc. In implementations, the computer terminal 100 may further include a network interface, a power supply and/or a camera (which are not shown in the figure). One of ordinary skill in the art can understand that the structure shown in FIG. 1 is intended for illustration only, and is not construed as a limitation to the structure of the above electronic device. For example, the computer terminal 100 may also include more or fewer components than those shown in FIG. 1, or have a configuration different from that shown in FIG. 1.

It needs to be noted that the one or more processors 102 and/or other data processing circuits may generally be referred to as "data processing circuits" herein. The data processing circuit can be embodied in whole or in part as software, hardware, firmware or any other combination. In addition, the data processing circuit may be a single independent processing module, or fully or partially integrated into any one of other components in the computer terminal 100 (or the mobile device). As mentioned in the embodiments of the present disclosure, the data processing circuit is used as a type of processor control (for example, a selection of a variable resistance terminal path that is connected to an interface).

The memory 104 may be configured to store software programs and modules of application software, such as program instructions/data storage devices corresponding to the virtual machine scheduling method in the embodiments of the present disclosure. The processor(s) 102 execute(s) various functional applications and data processing by software program(s) and module(s) stored in the memory 104, i.e., implementing the virtual machine scheduling method. The memory 104 may include a high-speed random access memory, and may also include a non-volatile memory, such as one or more magnetic storage devices, flash memory, or other non-volatile solid-state memory. In some examples, the memory 104 may further include storage devices that are remotely deployed with respect to processor(s) 102, and these storage devices may be connected to the computer terminal 100 via a network. Examples of the network include, but are not limited to, the Internet, a corporate intranet, a local area network, a mobile communication network, and a combination thereof.

The transmission device 106 is configured to receive or send data via a network. Specific examples of the network may include a wireless network provided by a communication provider of the computer terminal 100. In an example, the transmission device 106 includes a network adapter (Network Interface Controller, NIC), which can be connected to other network devices through a base station to communicate with the Internet. In an example, the transmission device 106 may be a radio frequency (RF) module, which is used to communicate with the Internet wirelessly.

The display 108 may be, for example, a touch screen liquid crystal display (LCD), which may enable a user to interact with a user interface of the computer terminal 100 (or the mobile device).

It should be noted here that, in some alternative embodiments, the computer device (or the mobile device) as shown in FIG. 1 may include hardware elements (including circuits) and software elements (including computer codes stored on a computer-readable medium), or a combination of hardware and software components. It should be noted that FIG. 1 is only an example of specific embodiments, and is intended to show types of components that may be present in the computer device (or mobile device) as described above.

Figure 2:
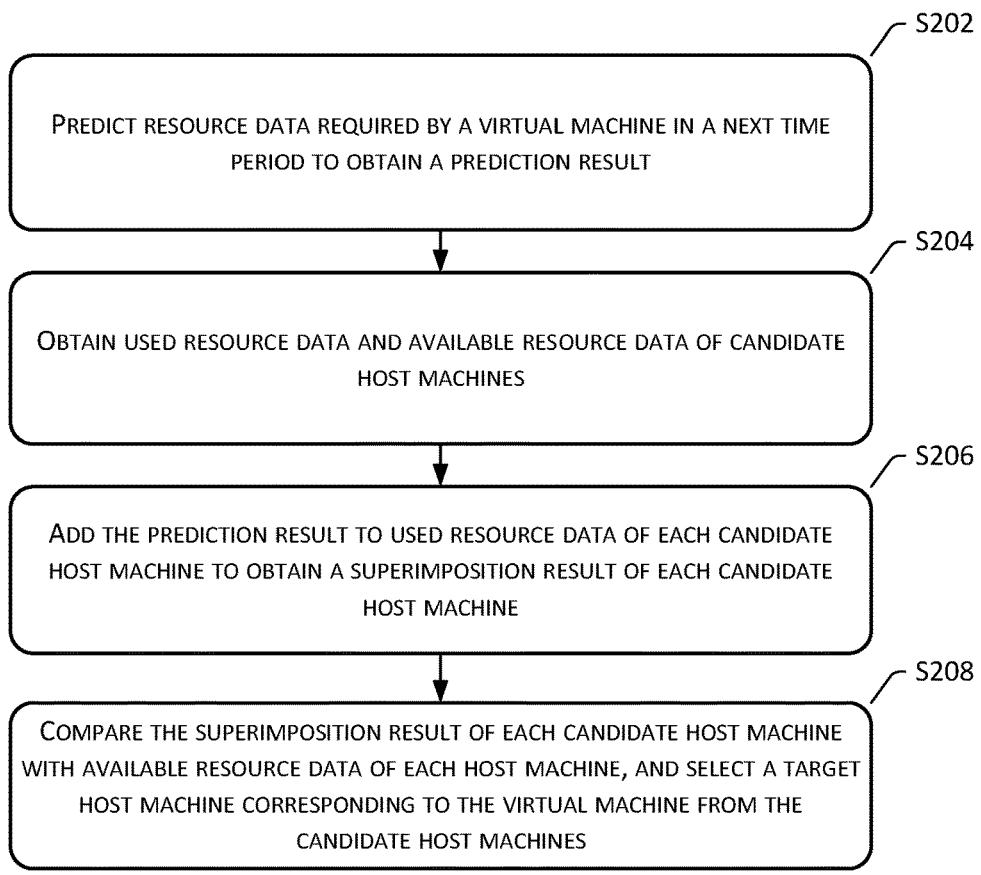
FIG. 2 is a flowchart of a method for scheduling a virtual machine according to the embodiments of the present disclosure.

In the above operating environment, the present disclosure provides a flowchart of a virtual machine scheduling method as shown in FIG. 2. FIG. 2 is a flowchart of a method 200 for scheduling a virtual machine according to the embodiments of the present disclosure.

Step S202: Predict resource data required by a virtual machine in a next time period to obtain a prediction result, where the resource data includes at least one of the following: processor resources, a number of times of processor contentions, a number of cache misses, and a utilization rate of power consumption.

In implementations, the virtual machine may be a newly created virtual machine or a virtual machine that may need to be migrated. For example, when a host machine running the virtual machine fails, or the host machine running the virtual machine is overloaded, it is necessary to migrate the virtual machine is to ensure stable operations of the virtual machine.

The above processor can be a CPU, and CPU resources can be determined according to a utilization rate of the CPU. The utilization rate of the CPU is a degree to which the CPU is utilized, and can be expressed as a percentage. For a virtual machine, a processor resource is a virtual processor (VCPU) resource. For a host machine, a processor resource is a physical CPU resource. A number of processor contentions may refer to a number of times that threads of virtual machine(s) wait in a kernel of a host machine for more than a predetermined time. A number of cache misses is CPU cache misses, which is used to refer to a number of misses when a virtual machine reads a cache of a host machine.

In implementations, a time period for the above may be seven days, and the resource data required by the virtual machine in the next time period can be predicted by obtaining historical resource data of the virtual machine.

An application scenario of an enterprise is used as an example. The enterprise allocates a virtual machine account for each employee, and an employee logs in to his/her virtual machine office through an account thereof. In this case, data, such as the time when each employee uses a virtual machine, CPU resources that are used, etc., has a certain pattern. Therefore, a resource data pattern of the virtual machine can be determined through historical resource data of the virtual machine, and resource data required by the virtual machine in a next time period can be predicted according to the pattern that is obtained.

Step S204: Obtain used resource data and available resource data of candidate host machines.

In implementations, a candidate host machine is a host machine that is allowed to run a virtual machine, and more than one may exist. An application scenario of an enterprise is still used as an example. A host machine of the enterprise is allowed to run each virtual machine of the enterprise. Therefore, when scheduling a virtual machine of the enterprise, the host machine of the enterprise is a candidate host machine.

Used resource data of a candidate host machine may be CPU resources used by the candidate host machine, a number of CPU contentions, a number of cache misses, and/or a utilization rate of power consumption. The number of times of CPU contentions used by the candidate host machine, the number of cache misses and/or the utilization rate of power consumption can be obtained through detection, and the CPU resources used by the candidate host machine can be determined through VCPU resources used by all virtual machines running on the host machine.

Available resource data of a candidate host machines refers to resource data that the candidate host machine allows virtual machines to use. A candidate host machine has certain resource data, which may include: CPU resources, a predetermined number of times of CPU contentions, a predetermined number of cache misses, and a predetermined utilization rate of power consumption. Each piece of resource data may have a corresponding usage threshold, i.e., a portion to be used being allowed to account for a proportion of all resource data. For example, if a predetermined threshold is 80%, virtual machine(s) can use 80% of all resource data of the host machine.

Step S206: Add the prediction result to used resource data of each candidate host machine to obtain a superimposition result of each candidate host machine.

In the above solution, the prediction result is added to used resources of a candidate host machine to predict resource data required by the candidate host machine after the virtual machine is migrated to the candidate host machine.

In implementations, after obtaining the resource data of the candidate host machines, the prediction result of the virtual machine and the resource data of the corresponding candidate host machines are separately added to obtain superimposition results. More specifically, resource data of a virtual machine includes: a CPU resource $A1$ required by the virtual machine, a number of times of CPU contentions $B1$, a number of cache misses $C1$, and a utilization rate of power consumption $D1$. Resource data of a candidate host machine includes: used CPU resource $A2$, a number of times of CPU contention $B2$, a number of cache misses $C2$, and a utilization rate of power consumption $D2$. A superposition result that is obtained is: $A1+A2$, $B1+B2$, $C1+C2$, and $D1+D2$.

Step S208: Compare the superimposition result of each candidate host machine with available resource data of each host machine, and select a target host machine corresponding to the virtual machine from the candidate host machines.

In the above step S208, when a superimposition result of a candidate host machine exceeds available resource data of the candidate host machine, a determination can be made that the candidate host machine does not have enough resources to support operations of the virtual machine if the virtual machine is migrated to the candidate host machine, and this may cause the candidate host machine to be overloaded. When a superimposition result of a candidate host machine does not exceed available resource data of the candidate host machine, a determination can be made that the candidate host machine has sufficient resources to support operations of the virtual machine if the virtual machine is migrated to the candidate host machine. Therefore, by comparing the superimposition result of each candidate host machine with the available resource data of each host machine, a target host machine that can support operations of the virtual machine can be selected from the candidate host machines.

In implementations, in combination with the previous embodiment, a candidate host machine is taken as an example. Available resource data of the candidate host machine is: available CPU resource $A3$, a number of times of CPU contentions $B3$, and a number of cache misses $C3$ and a utilization rate of power consumption $D3$. If $A1+A2<A3$, $B1+B2<B3$, $C1+C2<C3$, and $D1+D2<D3$ can be met, the host machine is determined to be a target host machine. If any of the above conditions is not satisfied, a determination is made that the host machine is not a target host machine.

In the foregoing embodiments, it needs to be noted that the solution predicts and schedules resource data used by a virtual machine in a future time period, and obtains currently used resource data and available resource data of candidate host machines to determine to which candidate host machine the virtual machine is migrated, i.e., to determine a target host machine. As a result, a host machine can be selected more accurately for the virtual machine, without requiring each host machine to reserve resources for respective peaks of each virtual machine, reducing a waste of resources, being able to evenly schedule and distribute virtual machines on different host machines as much as possible to achieve stable load balancing of physical machines.

Therefore, the foregoing embodiments of the present disclosure solve the technical problem of a large waste of resources caused by the needs of host machines to reserve resources for respective peaks of each virtual machine in the existing technologies.

Figure 3:
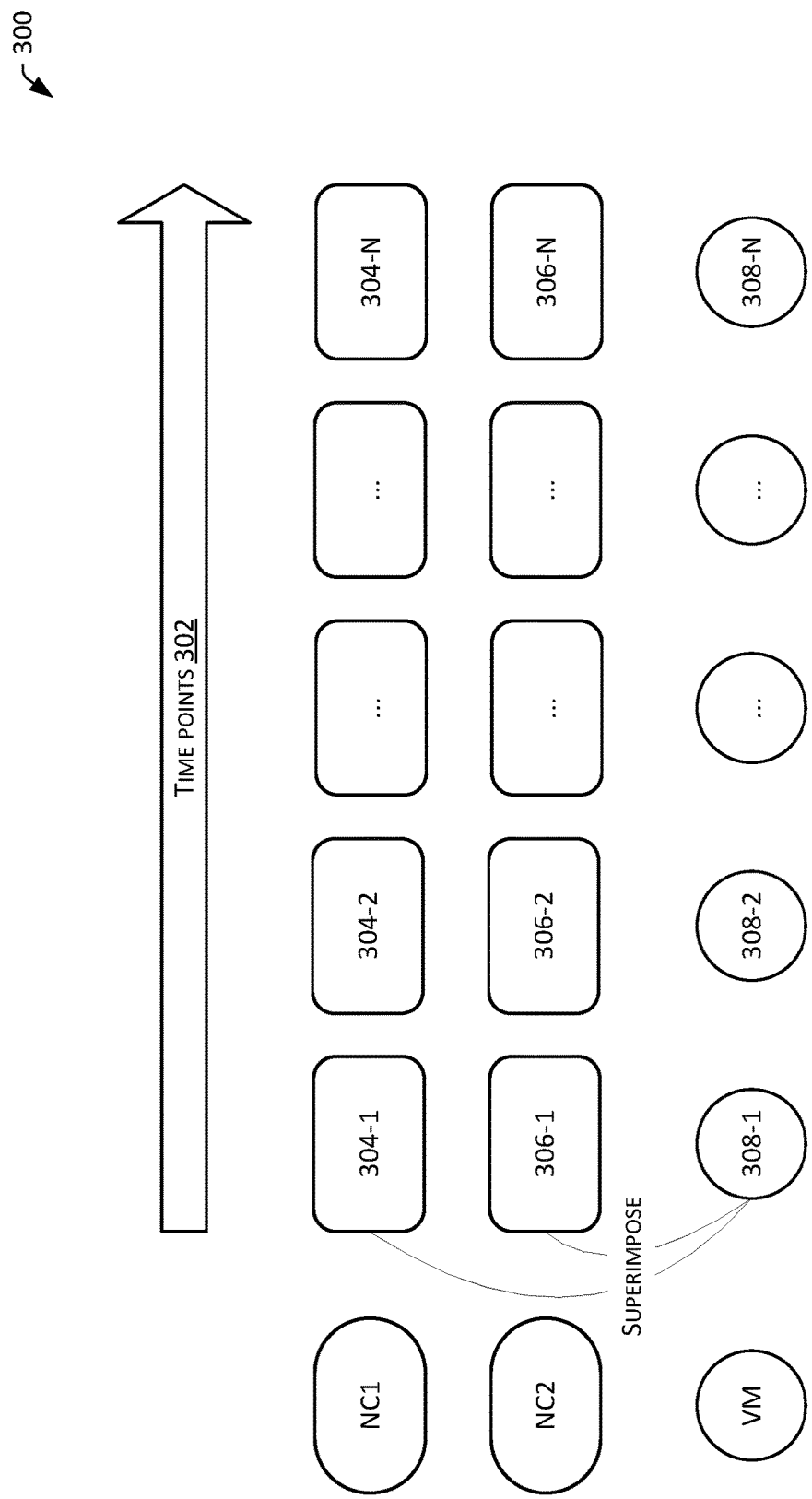
FIG. 3 is a schematic diagram of a virtual machine migration according to the embodiments of the present disclosure.

FIG. 3 is a schematic diagram of a virtual machine migration 300 according to the embodiments of the present disclosure. As shown in FIG. 3, NC1 and NC2 are two host machines respectively. VM is a virtual machine waiting to be migrated, and it is necessary to determine to which host machine the virtual machine VM is migrated.

As can be seen according to the solutions provided by the foregoing embodiments and in combination with FIG. 3, a prediction result of the virtual machine VM in a future time period is added to respective used resource data of NC1 and NC2, which are then separately compared with available resources of NC1 and NC2. As such, which host machine the virtual machine VM is migrated to can be determined.

In implementations, in order to make a prediction to be more accurate, a time period can be divided into multiple preset time segments. As shown in FIG. 3, a time arrow 302 indicates a time trend within the time period, and rectangles 304-1, 304-2, . . . , 304-N, 306-1, 306-2, . . . , 306-N after NC1 and NC2 indicates that NC1 and NC2 are respective used resource data of each time segment. Circles 308-1, 308-2, . . . , 308-N behind the virtual machine VM indicate prediction results of the virtual machine VM in each time segment. A corresponding prediction result of each time segment is added with the respective used resource data of NC1 and NC2 in each time segment, which are then separately compared with respective available resource data of NC1 and NC2. In this way, a host machine to which the virtual machine VM is migrated can be determined more accurately.

Performing a prediction of resource data required by a virtual machine in a future time period using a method of dividing the time period into multiple preset time periods is described hereinafter.

In implementations, the time period includes multiple preset time segments, and predicting resource data required by the virtual machine in a next time interval to obtain a prediction result includes: obtaining a prediction model, wherein the prediction model is used to represent corresponding relationships between prediction results of virtual machines having different attribute parameters and preset time segments. The attribute parameters include identifications, specifications, and application types of the virtual machines; inputting attribute parameters of the virtual machine into the prediction model; and receiving a prediction result of the virtual machine that is outputted from the prediction model.

In implementations, an identification of a virtual machine may be a user ID, i.e., user_id. A user logs into the virtual machine through user_id and a corresponding password. A specification of a virtual machine is used to indicate that the virtual machine includes multiple VCPU and an amount of cache that the virtual machine has. An application type of a virtual machine may be determined according to the purpose of the virtual machine. An application type may be a type of online service (for example: used as a website server) or a type of offline computing (for example: big data computing).

The prediction model may be a neural network model obtained by training on existing data (for example: historical resource data of a virtual machine).

The attribute parameters are all parameters that have a relatively large impact on resource data used by virtual machines. For example, for user identifications, different users have different habits of using a virtual machine, and the resource data used has strong personal characteristics. For specifications, resource data occupied by virtual machines of different specifications differ greatly when running. For application types, resource data used by virtual machines of different application types at runtime also have large differences.

Therefore, the above-mentioned solutions use these attribute parameters as characteristics of a virtual machine, and input them into the prediction model. The prediction model makes a prediction based on such input data, and returns a prediction result for the virtual machine.

In implementations, before inputting the attribute parameters of the virtual machine to the prediction model, the above method further includes: obtaining a degree of confidence of the prediction model and a preset confidence threshold; entering the step of inputting the attribute parameters of the virtual machine into the prediction model if the degree of confidence of the prediction model is greater than or equal to the confidence threshold; and if the degree of confidence of the prediction model is less than the confidence threshold, predicting resource data required by the virtual machine in the next time period based on virtual processor resources and a virtual processor utilization rate of the virtual machine.

For a virtual machine with a certain pattern, a prediction model thereof has a high degree of confidence. Therefore, for a virtual machine with a high degree of confidence, an accuracy of resource data predicted by a prediction model thereof is higher. For a virtual machine with an unobvious pattern, a degree of confidence of a prediction model thereof is low. Therefore, for a virtual machine with a low degree of confidence, an accuracy of resource data predicted by a prediction model thereof is low.

In the above solutions, a confidence threshold is set up in advance, and the confidence threshold is used to determine whether to use a prediction model to predict resource data of a virtual machine.

In implementations, if a degree of confidence of a prediction model of a virtual machine is 90%, and a confidence threshold is 85%, the prediction model of the virtual machine is allowed to be used to predict resource data of the virtual machine in a next time period.

In implementations, if a degree of confidence of a prediction model of a virtual machine is 80%, and a confidence threshold is 85%, a determination is made that a prediction accuracy of the prediction model of the virtual machine is low, and the prediction model is discarded. Virtual processor resources and a virtual processor utilization rate of the virtual machine are used for calculating resource data required by the virtual machine in a next time period according to a predetermined formula.

In implementations, obtaining the prediction model includes: obtaining sample data, wherein the sample data includes attribute information of a plurality of sample virtual machines and historical resource data of the sample virtual machines in a preset time segment; and obtaining the prediction model through model training.

Specifically, the above-mentioned preset time segment may be 6 hours, and each time segment is consecutive but not overlapping. For example, 0:00~6:00, 6:00~12:00, 12:00~18:00 and 18:00~24:00 in one day are four time segments in that day.

The sample virtual machines may be virtual machines having the same operating environment as that of the virtual machine. In order to ensure the accuracy of the trained prediction model, the number of sample virtual machines may be large, and distributed over different attribute information.

In implementations, since user behavior is usually related to the week, such as high utilization rates on weekdays and low utilization rates on weekends, a time period of 7 days is taken as an example. If a preset time segment is 6 hours, a time period includes 28 time segments. First sample virtual machines are selected. Multiple virtual machines with different identifications, different specifications, and different application types are selected as the sample virtual machines. Respective pieces of resource data of the sample virtual machines in 28 time segments in a time period are then obtained, i.e., obtaining historical resource data.

Afterwards, an empty model is obtained, and learning and training of the empty model is performed using the sample data to obtain a trained model. Verification data (which includes virtual machines with known attribute information and historical resource data of the virtual machines in different time periods) is then used to verify the trained model, and a prediction model is obtained upon successful verification.

In implementations, obtaining the prediction model and obtaining the historical resource data of the sample virtual machines in the preset time segment includes: collecting average resource data of multiple virtual processors of the virtual machines according to a preset sampling time, wherein the preset time segment includes multiple sampling times; and determining average resource data that is the maximum in the preset time segment as the historical resource data of the preset time segment.

In implementations, the sampling time may be 5 minutes, and a CPU of a virtual machine may have multiple VCPUs. Therefore, an average value of the multiple VCPUs is obtained.

In implementations, for a virtual machine with 4 VCPUs and each VCPU with 4 cores, resource data of all the cores is collected every 5 minutes, and an average value of the 16 cores is calculated to obtain average resource data of the virtual machine at that collection point. If a preset time segment is 6 hours, i.e., 360 minutes, the preset time segment includes 72 pieces of average resource data, and a maximum value of the 72 pieces of average resource data is determined as historical resource data of the time segment.

In implementations, when the resource data is a CPU resource, obtaining the used resource data of the candidate host machine includes: obtaining resources used by each virtual machine running on the candidate host machine in a preset time segment; and determining a sum of the resources used by each virtual machine in the preset time segment as used processor resources of the host machine in the preset time segment.

In implementations, obtaining the available resource data of the candidate host machine includes: obtaining total processor resources of the host machine and a preset utilization threshold, wherein the total processor resources of the host machine are a product of the number of physical cores of the host machine and a preset constant; and determining the product of the total processor resources of the host machine and the preset utilization threshold as the available resource data of the candidate host machine.

The above solutions propose a way to digitize processor resources. Specifically, digitizing resources of a CPU can be done in the following way. Resources provided by a physical core of a host machine's CPU are taken as a constant x. If the host machine has y physical cores, the resource of the CPU is x times y. In implementations, a CPU of a host machine includes 56 physical cores, and resources provided by a physical core are considered to be 100. CPU utilization resources of the host machine are 5600.

In the above solutions, CPU resources are digitized through a way of multiplying the number of physical cores by a preset constant. As such, resources of a host machine can be calculated by means of numerical calculation. In this way, the preset constant can be 100, i.e., resources provided by each physical core are calculated as 100 shares.

In implementations, obtaining the processor resources used by each virtual machine running on the host machine in multiple preset time segment includes: obtaining the number of virtual processors of the respective virtual machine and a total number of virtual processors created by the candidate host machine, an average utilization rate of virtual processors in each preset time segment, and the number of physical cores of the candidate host machine; obtaining a ratio between the number of virtual processors of the respective virtual machine and the total number of virtual processors created by the candidate host machine; obtaining a minimum value between the number of physical cores of the candidate host machine and the total number of virtual processors created by the candidate host machine; calculating a product of the ratio, the average utilization rate of virtual processors and the minimum; and determining the product as the processor resources of the respective virtual machine at the preset time segment.

In implementations, the aforementioned average utilization rate of VCPU can be obtained from historical data, which can be specifically: a maximum average value of average values corresponding to the multiple sampling times in each time segment (where each time segment includes multiple sampling times), wherein an average value corresponding to each sampling time is an average utilization rate of all cores of virtual machines at the respective sampling time.

In implementations, if the number of VCPUs of a virtual machine is a, a total number of VCPUs of a host machine is b, an average utilization rate of VCPU is c, and the number of physical cores of the host machine is d, resources of the virtual machine is then $e=(a/b)*c*min(d,b)$. More specifically, if the host machine NC1 has 56 physical cores, 80 VCPUs are created, the virtual machine VM1 has 8 VCPUs, and an average CPU utilization rate of VM1 is 50%, resources occupied by physical cores of VM1 are then $(8/80)*50*56=280$.

Table 1 shows a way of calculating used CPU resources and available CPU resources of a host machine, By combining with Table 1, in this example, a time period is 7 days, and the time period includes 4 time segments, each time segment is 6 hours, and the 4 time segments are consecutive, and do not overlap with each other. Table 1 only shows a method of calculating the first two time segments of the first day. The method of calculating other time segments is the same. Details are described hereinafter in conjunction with Table 1.

The first time segment (0~6) in the first day for NC1 is described first. NC1 has 56 physical cores, and 20 VCPUs are created, which are separately applied to VM1 (4 cores), VM2 (8 cores) and VM3 (8 cores).

An average VCPU utilization rate of VM1 in the first time segment is 5, used CPU resources of VM1 in the first time segment can be obtained using the formula "$e=(a/b)*c*min(d,b)$" in the above embodiment $e1=(4/20)*5*min(56,20)=20$.

An average VCPU utilization rate of VM2 in the first time segment is 20. Resources used by VM2 in the first time segment are obtained as $e2=160$ using the same formula. An average VCPU utilization of VM3 in the first time segment is 30. Using the same formula, resources used by VM3 in the first time segment are $e3=240$. Therefore, used CPU resources of NC1 in the first time segment is $e1+e2+e3=420$. In this example, the preset constant is 100, the preset utilization threshold is 80%, and the total CPU resource of NC1 is $56*100=5600$. Therefore, available resources of NC1 are $5600*80\%=4060$.

Used CPU resources and available CPU resources of NC1 in other time segments, and used CPU resources and available CPU resources of NC2 in each time segment can be calculated using the above scheme.

TABLE 1

|  |  | First day (0~6) | First day (6~12) | ... | Second day (0~6) | Second day (6~12) | ... |
|---|---|---|---|---|---|---|---|
| NC1 (56 physical cores) | VM1 (4 cores) | 5 | 20 |  |  |  |  |
|  | VM2 (8 cores) | 20 | 10 |  |  |  |  |
|  | VM3 (8 cores) | 30 | 80 |  |  |  |  |
|  | Total CPU resources | 5600 | 5600 |  |  |  |  |
|  | Predicted NC used resources | 420 | 800 |  |  |  |  |
|  | Predicted available resources of NC (limited to use 80%) | 4060 | 4060 |  |  |  |  |
| NC2 | VM4 | 10 | 61 |  |  |  |  |
|  | VM5 | 13 | 32 |  |  |  |  |

It needs to be noted that, in the foregoing embodiments, an average VCPU utilization rate of a virtual machine in each time segment can be obtained by obtaining historical resource data, which specifically includes: collecting an average VCPU utilization rate of all cores associated with the virtual machine according to a preset sampling time, wherein each preset time segment in the time period includes multiple sampling times; and determining a maximum average utilization rate collected in a preset time segment as the VCPU average utilization rate of the preset time segment.

Figure 4:
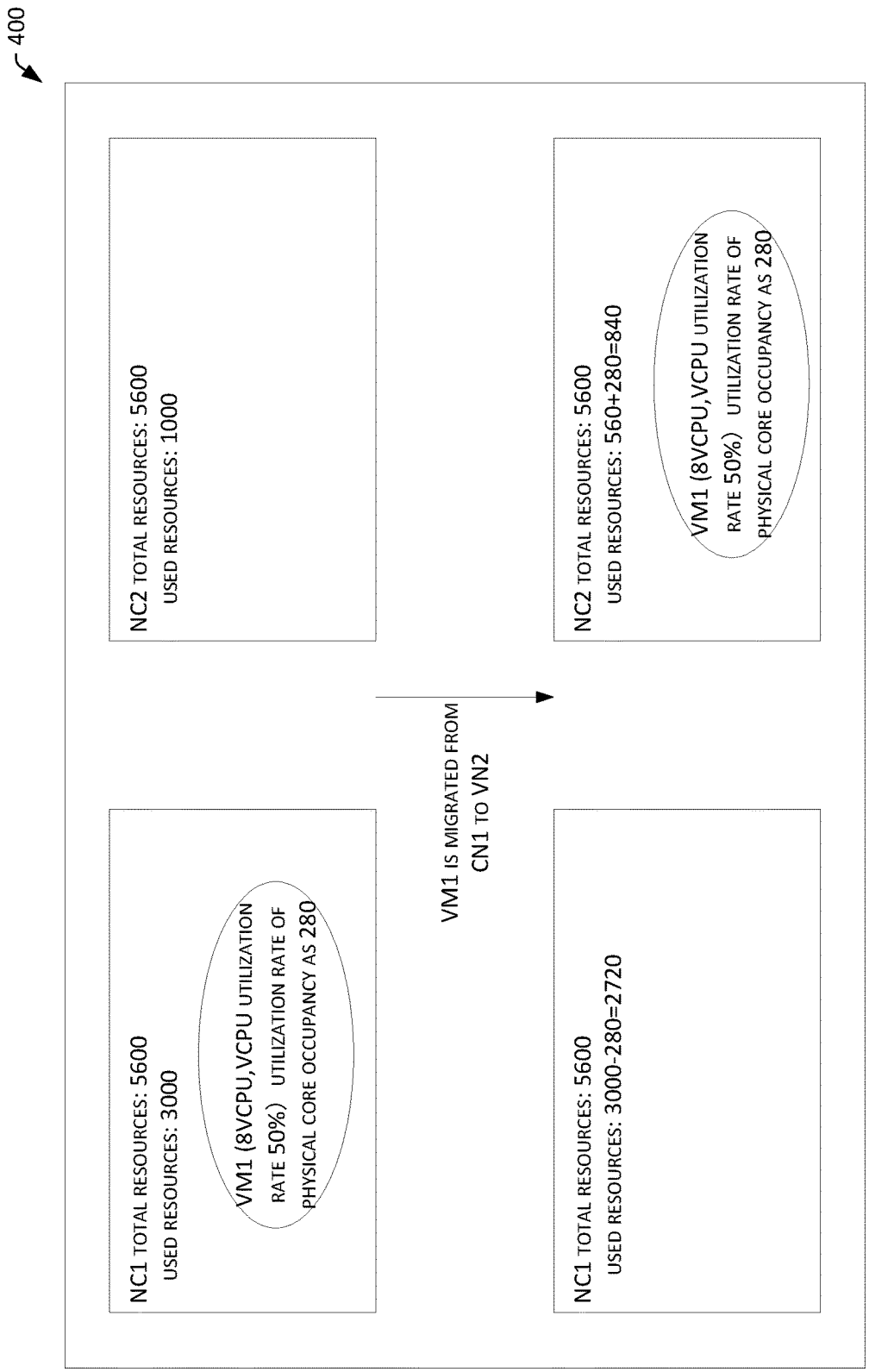
FIG. 4 is a schematic diagram of an optional change of used resources of a host machine before and after a virtual machine is migrated according to the embodiments of the present disclosure.

FIG. 4 is a schematic diagram showing a change 400 of used resources of a host machine before and after a migration of a virtual machine according to the embodiments of the present disclosure. As shown in FIG. 4, NC1 has 56 physical cores, CPU resources are 5600, and used resources are 3000. NC1 creates 80 VCPUs (virtual processors), VM1 includes 8 VCPUs, and an average utilization rate is 50%. Therefore, VM1 occupies resources of the host machine, i.e., CPU resources used by VM1 are 8/80*50*56=280.

NC2 also has 56 physical cores, CPU resources are 5600, an average CPU utilization of NC2 is 10%, and used CPU resources of NC2 are 5600*10%=560.

Therefore, after VM1 is migrated from NC1 to NC2, the used CPU resources of NC1 are 3000−280=2720, and the used CPU resources of NC2 are 560+280=840.

In implementations, the time period includes a plurality of preset time segments. Separately comparing the superimposition result of each candidate host machine with the available resource data of each host machine, and selecting the host machine corresponding to the virtual machine from the candidate host machines, includes: filtering and selecting candidate host machine(s) satisfying condition(s) from the candidate host machines, the condition(s) including a superimposition result of each preset time segment not exceeding available resource data of the host machine(s); and determining the candidates host machine(s) satisfying condition (s) as the target host machine corresponding to the virtual machine.

The above-mentioned solutions can be executed using a filter of a scheduling system. Through the above-mentioned solutions, a host machine that can support operations of the virtual machine is selected. When a superimposition result of a candidate host machine exceeds available resource data of the candidate host machine, a determination can be made that the candidate host machine does not have enough resources to support operation of the virtual machines if the virtual machine is migrated to the candidate host machine, and overloading of the candidate host machine may be resulted. When a superimposition result of a candidate host machine does not exceed available resource data of the candidate host machine, a determination can be made that the candidate host machine has enough resources to support operation of the virtual machines if the virtual machine is migrated to the candidate host machine. Therefore, by comparing the superimposition result of each candidate host machine with the available resource data of each host machine, a target host machine that can support operations of the virtual machine can be selected from the candidate host machines.

In implementations, when multiple candidate host machines satisfying the condition(s) exist, determining that the candidate host machine(s) satisfying the condition(s) as the host machine corresponding to the virtual machine includes: obtaining a weight value corresponding to each resource data; weighting superposition result(s) with weight value(s) to obtain respective weighted result(s) corresponding to the candidate host machine(s) satisfying the condition (s); and determining a candidate host machine having a smallest weighted result as the target host machine corresponding to the virtual machine.

The above solutions can be executed by a weighting device of the scheduling system. After filtering through the scheduling filter, multiple candidate host machines may exist. In other words, when multiple candidate host machines are able to support operations of the virtual machine, the weighting device integrates multiple types of data in the resource data to obtain a respective weighted result that can represent a resource usage of a candidate host machine if the virtual machine is migrated to the candidate host machine.

In implementations, weight values of each resource data can be arranged in a descending order as follows: processor resources, a utilization rate of power consumption, a number of times of processor contentions, and a number of cache misses, which are 50%, 30%, 10% and 10% respectively. In conjunction with the embodiments under step S206, if a superposition result of a candidate host machine is: A1+A2, B1+B2, C1+C2, and D1+D2, a weighted result corresponding to the host machine is (A1+A2)50%+(B1+B2)10%+(C1+C2)10%+(D1+D2)30%.

The foregoing embodiments show a method of calculating a weighted result of a host machine. According to such calculation, a weighted result of each candidate host machine that satisfies the condition(s) is calculated, and a candidate host machine having a smallest weighted result is selected as the target host machine.

In the above solutions, a weighted result of a candidate host machine that satisfies the condition(s) can explain a situation of resource utilization of the host machine after the virtual machine is migrated to the host machine. If the weighted result is relatively large, this means that more resources of the candidate host machine are used, and the load is relatively large if the virtual machine is migrated to the candidate host machine. If the weighted result is smaller, this means that fewer resources of the candidate host machine are used if the virtual machine is migrated to the candidate host machine. In order to maintain load balancing of host machines, the virtual machine is migrated to a candidate host machine with a smallest weighted result, i.e., a candidate host machine with a smallest weighted result is determined as the target host machine.

By assuming that the virtual machine is migrated to each candidate host machine that satisfies the condition(s), the above solutions predict situations of resource utilization of each host machine if the virtual machine is migrated to each candidate host machine, thereby determining the target host machine.

In implementations, after comparing the superimposition result of each candidate host machine with the available resource data of each host machine, and selecting the host machine corresponding to the virtual machine from the candidate host machine, the method further includes: migrating the virtual machine to the target host machine corresponding to the virtual machine.

The virtual machine is migrated to the corresponding target host machine, and the target host machine can provide the resource data required by the virtual machine when running. This can also achieve the purpose of balancing loads on host machines.

In implementations, when the virtual machine is a newly created virtual machine, predicting the resource data required by the virtual machine in the next time period to obtain the prediction result includes: obtaining an identifier and/or a specification of the newly created virtual machine; searching for a target virtual machine with a same identifier and/or a same specification of the newly created virtual machine; and determining that a prediction result of the target virtual machine is a prediction result of the newly created virtual machine.

For a newly created virtual machine, a prediction result of a virtual machine with an identifier and a specification that are the same as an identifier and a specification of the newly created virtual machine is selected as a prediction result of the newly created virtual machine.

In implementations, if no target virtual machine with the same identifier and specification as the newly created virtual machine exists, and if a target virtual machine with a same identifier and a different specification with respect to the newly created virtual machine exists, and a target virtual machine with a same specification and a different identifier with respect to the newly created virtual machine exists, a prediction result of the target virtual machine with the same identifier as the newly created virtual machine is selected as a prediction result of the newly created virtual machine.

Figure 5:
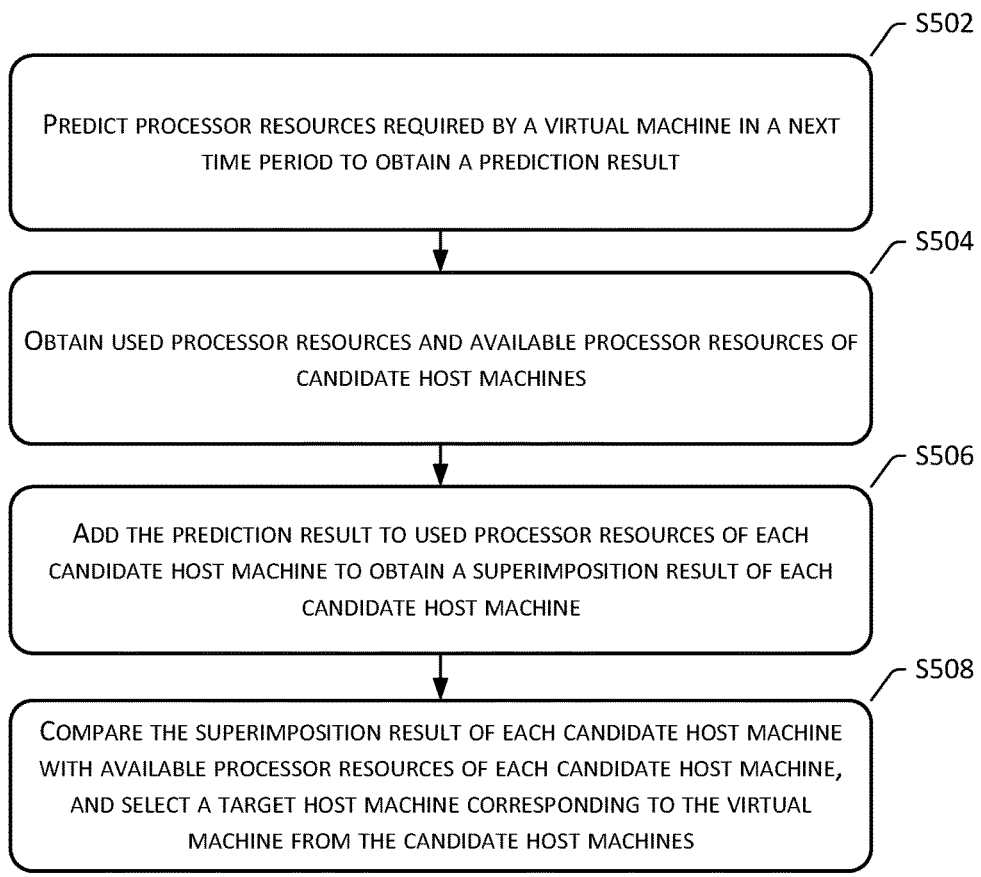
FIG. 5 is a flowchart of a method for scheduling a virtual machine according to the embodiments of the present disclosure.

According to the embodiments of the present disclosure, an embodiment of a method for scheduling a virtual machine is also provided. FIG. 5 is a flowchart of a method 500 for scheduling a virtual machine according to the embodiments of the present disclosure. As shown in FIG. 5, the method 500 includes the following steps.

Step S502: Predict processor resources required by a virtual machine in a next time period to obtain a prediction result.

Specifically, the virtual machine may be a newly created virtual machine or a virtual machine that may need to be migrated. For example, when a host machine running the virtual machine fails, or a host machine running the virtual machine is overloaded, it is necessary to migrate the virtual machine to ensure stable operations of the virtual machine.

In implementations, the time period as described above may be seven days, and the resource data required by the virtual machine in the next time period can be predicted by obtaining historical resource data of the virtual machine.

Step S504: Obtain used processor resources and available processor resources of candidate host machines.

In implementations, available processor resources of a candidate host machine refer to processor resources that the candidate host machine allows virtual machine(s) to use. A candidate host machine has certain total processor resources and a corresponding usage threshold, i.e., a percentage of allowable uses of all resource data. For example, if the predetermined threshold is 80%, virtual machine(s) can use 80% of total processor resources of the host machine.

Step S506: Add the prediction result to used processor resources of each candidate host machine to obtain a superimposition result of each candidate host machine.

In the above solutions, the prediction result is added to used processor resources of a candidate host machine to predict processor resources required by the candidate host machine after the virtual machine is migrated to the candidate host machine.

Step S508: Compare the superimposition result of each candidate host machine with available processor resources of each candidate host machine, and select a target host machine corresponding to the virtual machine from the candidate host machines.

In the above step S508, when a superimposition result of a candidate host machine exceeds available processor resource data of the candidate host machine, a determination can be made that the candidate host machine does not have enough processor resources to support operations of the virtual machine if the virtual machine is migrated to the candidate host machine, and this may cause the candidate host machine to be overloaded. When a superimposition result of a candidate host machine does not exceed available processor resource data of the candidate host machine, a determination can be made that the candidate host machine has sufficient processor resources to support operations of the virtual machine if the virtual machine is migrated to the candidate host machine. Therefore, by comparing the superimposition result of each candidate host machine with the available processor resource data of each host machine, a target host machine that can support operations of the virtual machine can be selected from the candidate host machines.

In the foregoing embodiments, it needs to be noted that the solutions predict and schedule resource data used by a virtual machine in a future time period, obtain currently used processor resources and available processor resources of candidate host machines, determine which candidate host machine the virtual machine needs to be migrated to, i.e., determining a target host machine. As such, a host machine can be selected more accurately for the virtual machine, without requiring each host machine to reserve resources for respective peaks of each virtual machine. This reduces a waste of resources, and evenly schedules and distributes virtual machines on different host machines as much as possible to achieve stable load balancing of physical machines.

Therefore, the foregoing embodiments of the present disclosure solve the technical problem that a host machine needs to reserve resources for respective peaks of each virtual machine in the existing technologies, which leads to a large waste of resources.

In implementations, obtaining the available processor resources of the candidate host machines includes: obtaining a preset constant, respective numbers of physical cores of the host machines, and a preset threshold, wherein the preset threshold is less than one; and determining respective products of the preset constant, the respective numbers of physical cores of the host machines and the preset threshold as the available processor resources of the host machines.

The above solutions propose a way to digitize processor resources. Specifically, digitizing resources of a CPU can be done in the following way. Resources provided by a physical core of a host machine's CPU are taken as a constant x. If the host machine has y physical cores, the resource of the CPU is x times y. In implementations, a CPU of a host machine includes 56 physical cores, and resources provided by a physical core are considered to be 100. CPU utilization resources of the host machine are 5600.

In implementations, the time period includes a plurality of preset time segments, and obtaining the used processor resources of the candidate host machines includes: obtaining processor resources of each virtual machine running on a candidate host machine in a preset time segment; and determining a sum of the processor resources of each virtual machine as used processor resources of the candidate host machine in the preset time segment.

In implementations, obtaining the processor resources of each virtual machine running on the candidate host machine for the preset time segment includes: obtaining the number of virtual processors of the respective virtual machine and a total number of virtual processors created by the candidate host machine, an average utilization rate of virtual processors in each preset time segment, and the number of physical cores of the candidate host machine; obtaining a ratio between the number of virtual processors of the respective virtual machine and the total number of virtual processors created by the candidate host machine; obtaining a minimum value between the number of physical cores of the candidate host machine and the total number of virtual processors created by the candidate host machine; calculating a product of the ratio, the average utilization rate of virtual processors and the minimum; and determining the product as the processor resources of the respective virtual machine at the preset time segment.

In implementations, if the number of VCPUs of a virtual machine is a, a total number of VCPUs of a host machine is b, an average utilization rate of VCPU is c, and the number of physical cores of the host machine is d, resources of the virtual machine is then $e=(a/b)*c*\min(d,b)$. More specifically, if the host machine NC1 has 56 physical cores, 80 VCPUs are created, the virtual machine VM1 has 8 VCPUs, and an average CPU utilization rate of VM1 is 50%, resources occupied by physical cores of VM1 are then $(8/80)*50*56=280$.

It needs to be noted that the foregoing method embodiments are all expressed as a series of action combinations for the sake of simple description. One skilled in the art should know that the present disclosure is not limited by the described orders of actions, because certain steps can be performed in other orders or in parallel according to the present disclosure. Furthermore, one skilled in the art should also know that the embodiments described in the specification are all exemplary embodiments, and involved actions and modules may not be necessarily required by the present disclosure.

Through the description of the above embodiments, one skilled in the art can clearly understand that the methods according to the above embodiments can be implemented by means of software plus necessary general hardware platform, and apparently can also be implemented by hardware. However, in many cases, the former is a better implementation. Based on such understanding, the essence of the technical solutions of the present disclosure or the part that contributes to the existing technologies can be embodied in a form of a software product. Such computer software product is stored in a storage medium (such as ROM/RAM, a magnetic disk, an optical disk), and includes a number of instructions to cause a terminal device (which can be a mobile phone, a computer, a server, or a network device, etc.) to execute the method of each embodiment of the present disclosure.

Figure 6:
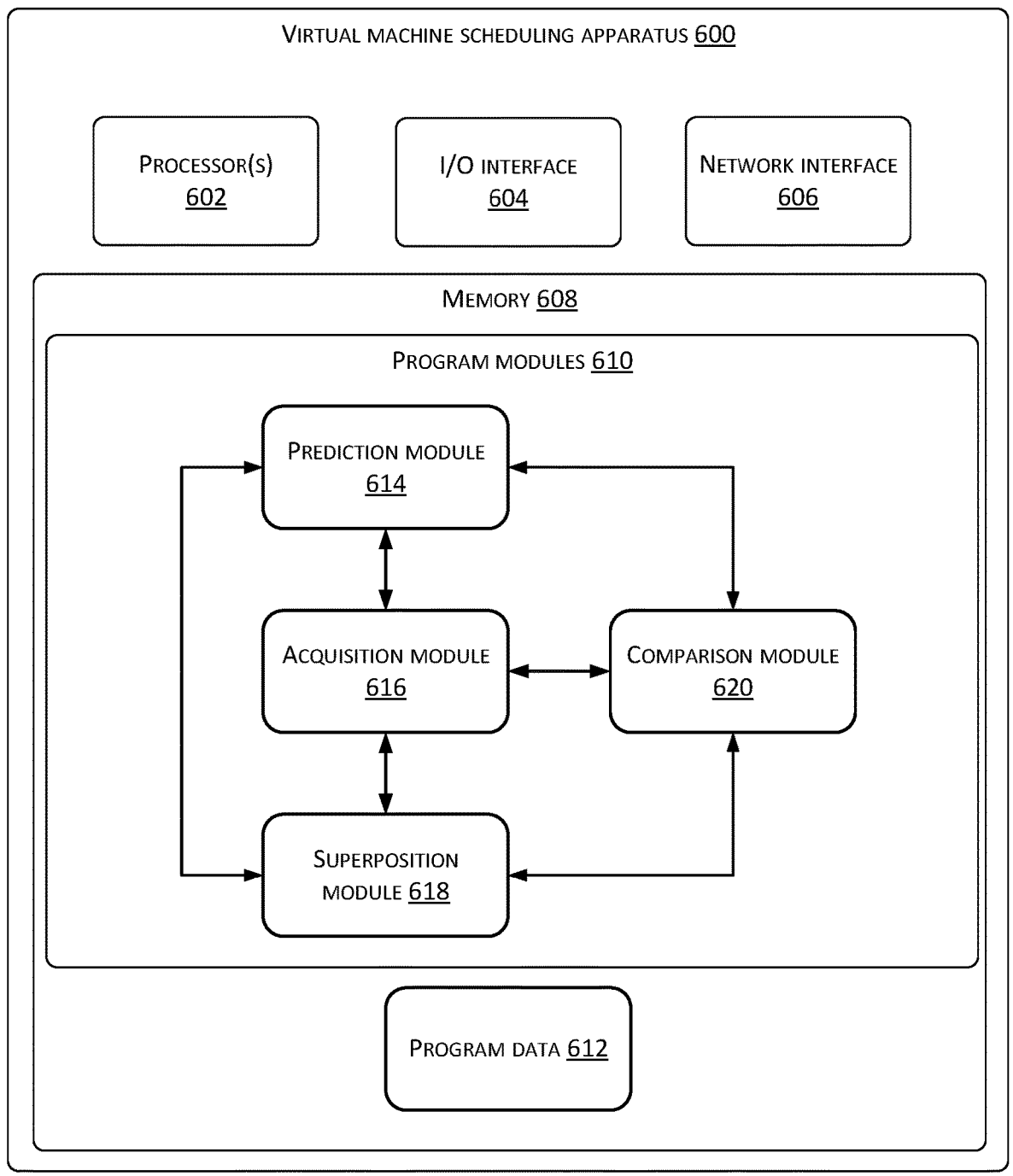
FIG. 6 is a schematic diagram of a virtual machine scheduling apparatus according to the embodiments of the present disclosure.

According to the embodiments of the present disclosure, a virtual machine scheduling apparatus 600 for implementing the above-mentioned virtual machine scheduling method is also provided. As shown in FIG. 6, the apparatus 600 may include one or more processors 602, an input/output (I/O) interface 604, a network interface 606, and memory 608.

The memory 608 may include a form of computer readable media such as a volatile memory, a random access memory (RAM) and/or a non-volatile memory, for example, a read-only memory (ROM) or a flash RAM. The memory 608 is an example of a computer readable media. In implementations, the memory 608 may include program modules 610 and program data 612.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the apparatus 600 may further include:
  a prediction module 614 configured to predict resource data required by a virtual machine in a next time period to obtain a prediction result, wherein the resource data includes at least one of the following: processor resources, a number of times of processor contentions, a number of cache misses, and a utilization rate of power consumption;
  an acquisition module 616 configured to obtain used resource data and available resource data of candidate host machines;
  a superimposition module 618 configured to add the prediction result to resource data of each candidate host machine to obtain a superimposition result of each candidate host machine; and
  a comparison module 620 configured to separately compare the superimposition result of each candidate host machine with available resource data of each host machine, and select a target host machine corresponding to the virtual machine from the candidate host machines.

It needs to be noted here that the prediction module 614, the acquisition module 616, the superposition module 618, and the comparison module 620 as described above correspond to steps S202 to S208 in the foregoing embodiments. Examples and application scenarios implemented by the four modules are the same as corresponding steps, but are not limited to, the content disclosed in the foregoing embodiments. It needs to be noted that the above-mentioned modules can run in the computer terminal 100 as a part of the apparatus provided in the foregoing embodiments.

In implementations, the time period includes a plurality of preset time segments, and the prediction module includes: a first acquisition sub-module configured to predict a prediction model, wherein the prediction model is used to represent corresponding relationships between prediction results of virtual machines having different attribute parameters and preset time segments, and the attribute parameters include identifications, specifications, and application types of the virtual machines; an input sub-module configured to input attribute parameters of the virtual machine into the prediction model; and a receiving sub-module configured to receive a prediction result of the virtual machine that is outputted from the prediction model.

In implementations, the prediction module further includes: a second acquisition sub-module configured to obtain a degree of confidence of the prediction model and a preset confidence threshold before the attribute parameters of the virtual machine are inputted into the prediction model; an entering sub-module configured to enter the step of inputting the attribute parameters of the virtual machine into the prediction model if the degree of confidence of the prediction model is greater than or equal to the confidence threshold; and a prediction sub-module configured to predict resource data required by the virtual machine in the next time period based on virtual processor resources and a virtual processor utilization rate of the virtual machine if the degree of confidence of the prediction model is less than the confidence threshold.

In implementations, the first acquisition sub-module includes: a first acquisition unit configured to obtain sample data, wherein the sample data includes attribute information of a plurality of sample virtual machines and historical resource data of the sample virtual machines in a preset time segment; and a training unit configured to obtain the prediction model through model training.

In implementations, the first acquisition unit includes: a collection subunit, configured to collect average resource data of multiple virtual processors of the virtual machines according to a preset sampling time, wherein the preset time segment includes multiple sampling times; and a determination subunit configured to determine average resource data that is the maximum in the preset time segment as the historical resource data of the preset time segment.

In implementations, the time period includes multiple preset time segments, and when the resource data is processor resources, the acquisition module includes: a third acquisition sub-module configured to obtain resources used by each virtual machine running on the candidate host machine in a preset time segment; and a first determination sub-module configured to determine a sum of the resources used by each virtual machine in the preset time segment as used processor resources of the host machine in the preset time segment.

In implementations, the acquisition module includes: a fourth acquisition sub-module configured to total processor resources of the host machine and a preset utilization threshold, wherein the total processor resources of the host machine are a product of the number of physical cores of the host machine and a preset constant; and a second determination sub-module configured to determine the product of the total processor resources of the host machine and the preset utilization threshold as the available resource data of the candidate host machine.

In implementations, the third acquisition sub-module includes: a second acquisition unit configured to obtain the number of virtual processors of the respective virtual machine and a total number of virtual processors created by the candidate host machine, an average utilization rate of virtual processors in each preset time segment, and the number of physical cores of the candidate host machine; a third acquisition unit configured to obtain a ratio between the number of virtual processors of the respective virtual machine and the total number of virtual processors created by the candidate host machine; a fourth acquisition unit configured to obtain a minimum value between the number of physical cores of the candidate host machine and the total number of virtual processors created by the candidate host machine; a ratio calculation unit configured to calculate a product of the ratio, the average utilization rate of virtual processors and the minimum; and a first determination unit configured to determine the product as the processor resources of the respective virtual machine at the preset time segment.

In implementations, the time period includes a plurality of preset time segments, and the comparison module includes: a filtering sub-module, configured to filter and select candidate host machine(s) satisfying condition(s) from the candidate host machines, the condition(s) including a superimposition result of each preset time segment not exceeding available resource data of the host machine(s); and a third determination sub-module configured to determine the candidates host machine(s) satisfying condition(s) as the target host machine corresponding to the virtual machine.

In implementations, multiple candidate host machines satisfying the condition(s) exist, the third determination sub-module includes: a fifth acquisition unit configured to obtain a weight value corresponding to each resource data; a weighting unit configured to weight superposition result(s) with weight value(s) to obtain respective weighted result(s) corresponding to the candidate host machine(s) satisfying the condition(s); a second determination unit configured to determine a candidate host machine having a smallest weighted result as the target host machine corresponding to the virtual machine.

In implementations, the apparatus further includes: a migration module configured to migrate the virtual machine to the target host machine corresponding to the virtual machine after the superimposition result of each candidate host machine is compared with the available resource data of each host machine, and the virtual host machine corresponding to the virtual machine is selected from the candidate host machines.

In implementations, when the virtual machine is a newly created virtual machine, the prediction module includes: a fifth acquisition sub-module configured to obtain an identifier and a specification of the newly created virtual machine; a searching sub-module configured to search for a target virtual machine with an identifier and a specification being the same as the identifier and/or the specification of the newly created virtual machine; and the fourth determination sub-module configured to determine that a prediction result of the target virtual machine is a prediction result of the newly created virtual machine.

Figure 7:
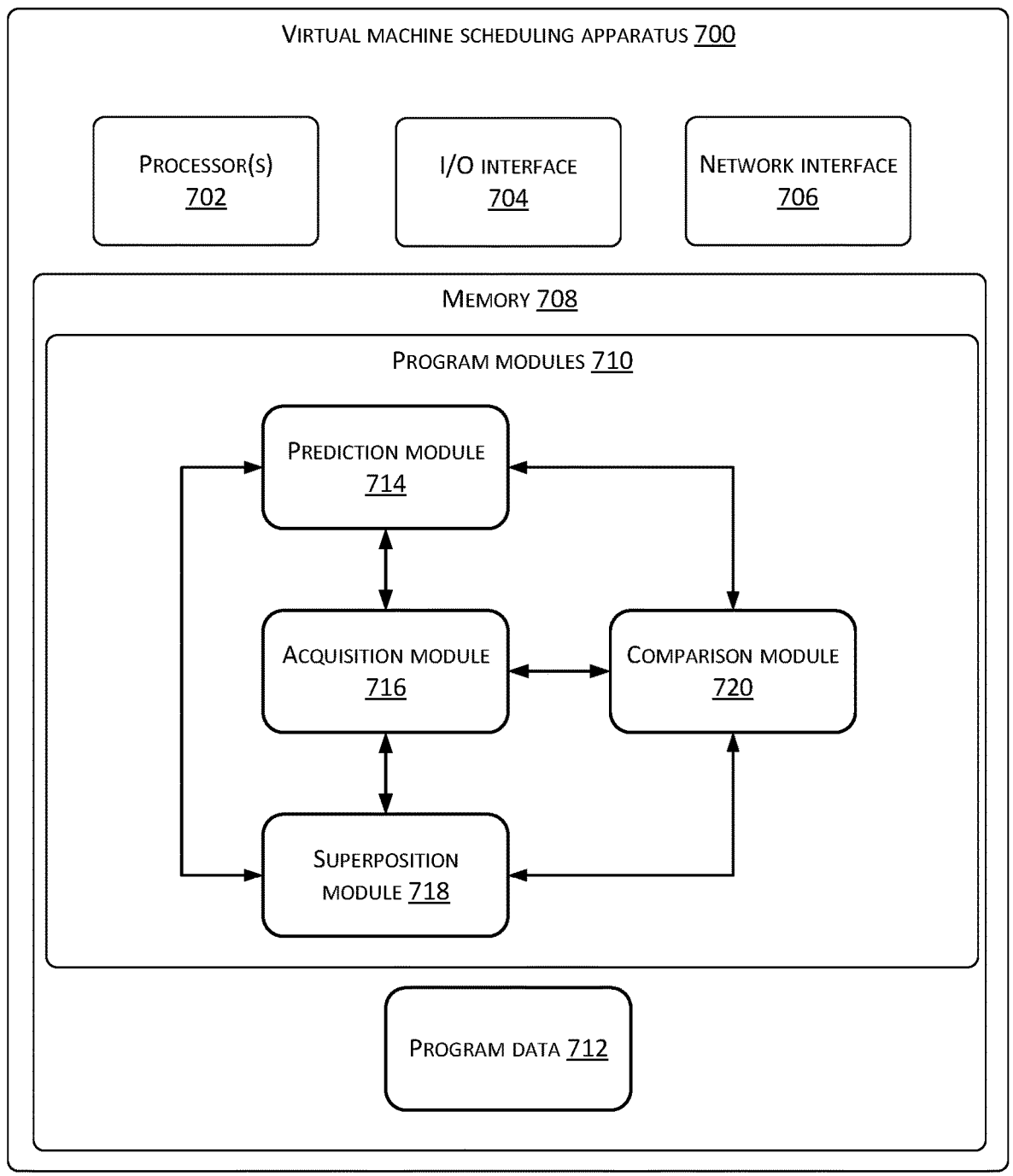
FIG. 7 is a schematic diagram of a virtual machine scheduling apparatus according to the embodiments of the present disclosure.

According to the embodiments of the present disclosure, a virtual machine scheduling apparatus 700 for implementing the above virtual machine scheduling method is also provided. As shown in FIG. 7, the apparatus 700 may include one or more processors 702, an input/output (I/O) interface 704, a network interface 706, and memory 708. The memory 708 may include a form of computer readable media as described in the foregoing description. In implementations, the memory 708 may include program modules 710 and program data 712.

As shown in FIG. 7, the apparatus 700 includes:

a prediction module 714 configured to predict processor resources required by a virtual machine in a next time period to obtain a prediction result;

an acquisition module 716 configured to obtain used processor resources and available processor resources of candidate host machines;

a superposition module 718 configured to add the prediction result to used processor resources of each candidate host machine to obtain a superimposition result of each candidate host machine; and a comparison module 720 configured to compare the superimposition result of each candidate host machine with available processor resources of each candidate host machine, and select a target host machine corresponding to the virtual machine from the candidate host machines.

It needs to be noted here that the prediction module 714, the acquisition module 716, the superposition module 718, and the comparison module 720 as described above correspond to steps S502 to S508 in the foregoing embodiments. Examples and application scenarios implemented by the four modules are the same as corresponding steps, but are not limited to, the content disclosed in the foregoing embodiments. It needs to be noted that the above-mentioned modules can run in the computer terminal 100 as a part of the apparatus provided in the foregoing embodiments.

In implementations, the prediction module includes: a first acquisition sub-module configured to obtain a preset constant, respective numbers of physical cores of the host machines, and a preset threshold, wherein the preset threshold is less than one; and a first determination sub-module configured to determine respective products of the preset constant, the respective numbers of physical cores of the host machines and the preset threshold as the available processor resources of the host machines.

In implementations, the time period includes a plurality of preset time segments, and the acquisition module includes: a second acquisition sub-module configured to obtain processor resources of each virtual machine running on a candidate host machine in a preset time segment; and a second determination sub-module configured to determine a sum of the processor resources of each virtual machine as used processor resources of the candidate host machine in the preset time segment.

In implementations, the second acquisition sub-module includes: a first acquiring unit configured to obtain the number of virtual processors of the respective virtual machine and a total number of virtual processors created by the candidate host machine, an average utilization rate of virtual processors in each preset time segment, and the number of physical cores of the candidate host machine; a second acquiring unit configured to obtain a ratio between the number of virtual processors of the respective virtual machine and the total number of virtual processors created by the candidate host machine; a third acquisition unit configured to obtain a minimum value between the number of physical cores of the candidate host machine and the total number of virtual processors created by the candidate host machine; calculating a product of the ratio, the average utilization rate of virtual processors and the minimum; and a determination unit configured to determine the product as the processor resources of the respective virtual machine at the preset time segment.

According to the embodiments of the present disclosure, a system is also provided, which includes: a processor; and a memory coupled to the processor, and configured to provide the processor with instructions for processing the following processing steps:

predicting resource data required by a virtual machine in a next time period to obtain a prediction result, wherein the resource data includes at least one of the following: processor resources, a number of times of processor contention, a number of cache misses, and a utilization rate of power consumption; obtaining used resource data and available resource data of candidate host machines; adding the prediction result to used resource data of each candidate host machine to obtain a superimposition result of each candidate host machine; and separately comparing the superimposition result of each candidate host machine with available resource data of each host machine, and selecting a target host machine corresponding to the virtual machine from the candidate host machines.

The embodiments of the present disclosure may provide a computer terminal. The computer terminal may be any computer terminal device in a computer terminal group. In implementations, the computer terminal may also be replaced with a terminal device such as a mobile terminal.

In implementations, the computer terminal may be located in at least one network device among multiple network devices in a computer network.

In implementations, the computer terminal can execute program codes of the following steps in a virtual machine scheduling method: predicting resource data required by a virtual machine in a next time period to obtain a prediction result, wherein the resource data includes at least one of the following: processor resources, a number of times of processor contention, a number of cache misses, and a utilization rate of power consumption; obtaining used resource data and available resource data of candidate host machines; adding the prediction result to used resource data of each candidate host machine to obtain a superimposition result of each candidate host machine; and separately comparing the superimposition result of each candidate host machine with available resource data of each host machine, and selecting a target host machine corresponding to the virtual machine from the candidate host machines.

Figure 8:
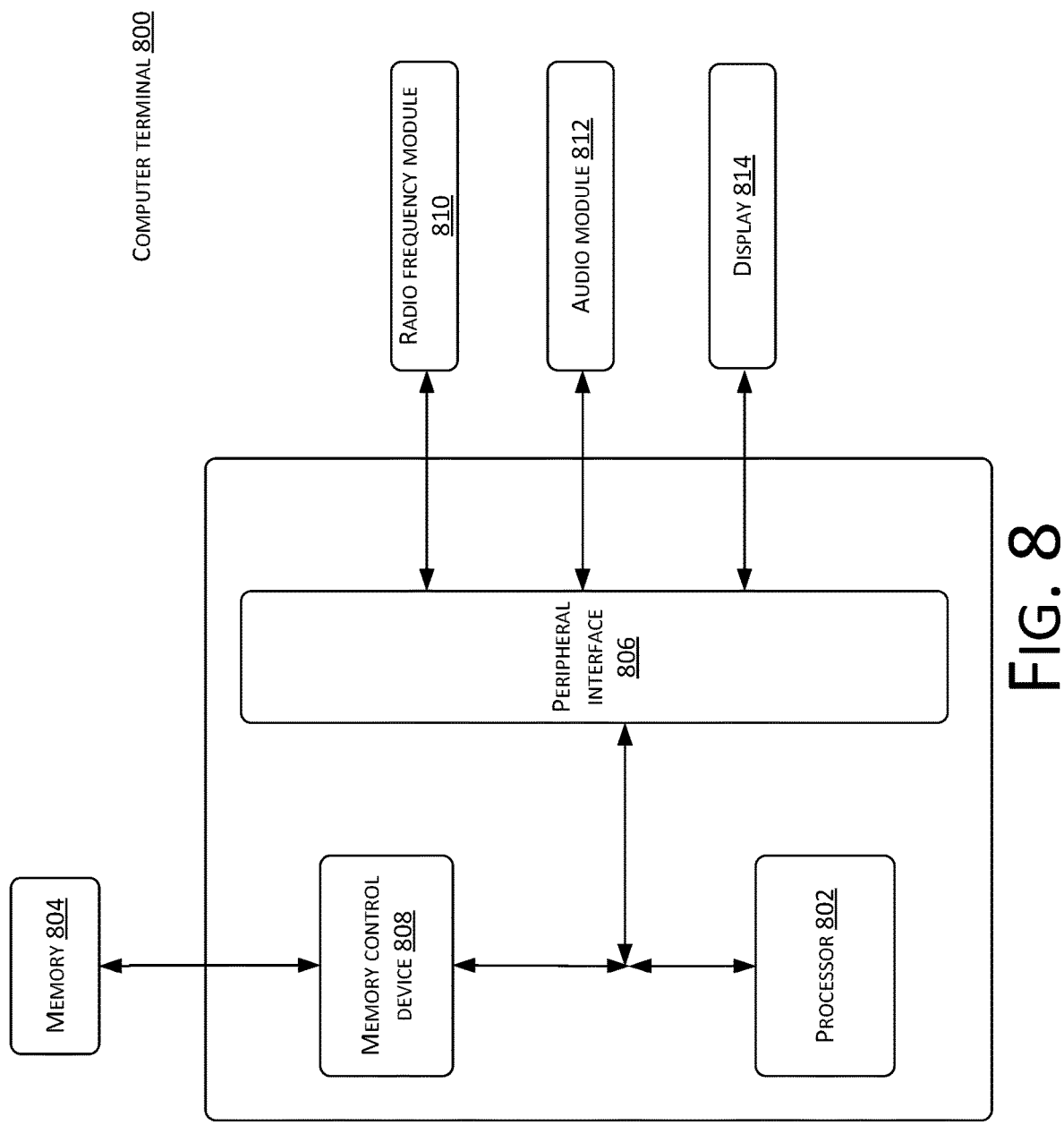
FIG. 8 is a structural block diagram of a computer terminal according to according to the embodiments of the present disclosure.

In implementations, FIG. 8 is a structural block diagram of a computer terminal 800 according to the embodiments of the present disclosure. As shown in FIG. 8, the computer terminal 800 may include: one or more (only one is shown in the figure) processors 802, memory 804, and a peripheral interface 806. In implementations, the computer terminal 800 may further includes a memory control device 808, a radio frequency module 810, an audio module 812, and/a display 814.

The memory 804 can be configured to store software programs and modules, such as program instructions/modules corresponding to the methods and apparatuses of scheduling virtual machine in the embodiments of the present disclosure. The processor(s) 802 execute(s) various functional applications and data processing by running the software programs and modules stored in the memory 804, i.e., implementing the above-mentioned methods of scheduling virtual machine. The memory 804 may include a high-speed random access memory, and may also include a non-volatile memory, such as one or more magnetic storage devices, flash memory, or other non-volatile solid-state memory. In some examples, the memory 804 may further include storage devices deployed remotely with respect to the processor, and these remote storage devices may be connected to the terminal A through a network. Examples of the network include, but are not limited to, the Internet, a corporate intranet, a local area network, a mobile communication network, and a combination thereof.

The processor(s) 802 may call information and application programs stored in the memory through a transmission device (not shown) to perform the following steps: predicting resource data required by a virtual machine in a next time period to obtain a prediction result, wherein the resource data includes at least one of the following: processor resources, a number of times of processor contention, a number of cache misses, and a utilization rate of power consumption; obtaining used resource data and available resource data of candidate host machines; adding the prediction result to used resource data of each candidate host machine to obtain a superimposition result of each candidate host machine; and separately comparing the superimposition result of each candidate host machine with available resource data of each host machine, and selecting a target host machine corresponding to the virtual machine from the candidate host machines.

In implementations, the processor(s) may also execute program codes of the following steps: obtaining a prediction model, wherein the prediction model is used to represent corresponding relationships between prediction results of virtual machines having different attribute parameters and preset time segments, the attribute parameters including identifications, specifications, and application types of the virtual machines; inputting attribute parameters of the virtual machine into the prediction model; and receiving a prediction result of the virtual machine that is outputted from the prediction model.

In implementations, the processor(s) may also execute program codes of the following steps: before inputting the attribute parameters of the virtual machine to the prediction model, the above method further includes: obtaining a degree of confidence of the prediction model and a preset confidence threshold; entering the step of inputting the attribute parameters of the virtual machine into the prediction model if the degree of confidence of the prediction model is greater than or equal to the confidence threshold; and if the degree of confidence of the prediction model is less than the confidence threshold, predicting resource data required by the virtual machine in the next time period based on virtual processor resources and a virtual processor utilization rate of the virtual machine.

In implementations, the processor(s) may also execute program codes of the following steps: obtaining sample data, wherein the sample data includes attribute information of a plurality of sample virtual machines and historical resource data of the sample virtual machines in a preset time segment; and obtaining the prediction model through model training.

In implementations, the processor(s) may also execute program codes of the following steps: collecting average resource data of multiple virtual processors of the virtual machines according to a preset sampling time, wherein the preset time segment includes multiple sampling times; and determining average resource data that is the maximum in the preset time segment as the historical resource data of the preset time segment.

In implementations, the processor(s) may also execute program codes of the following steps: obtaining resources used by each virtual machine running on the candidate host machine in a preset time segment; and determining a sum of the resources used by each virtual machine in the preset time segment as used processor resources of the host machine in the preset time segment.

In implementations, the processor(s) may also execute program codes of the following steps: obtaining total processor resources of the host machine and a preset utilization threshold, wherein the total processor resources of the host machine are a product of the number of physical cores of the host machine and a preset constant; and determining the product of the total processor resources of the host machine and the preset utilization threshold as the available resource data of the candidate host machine.

In implementations, the processor(s) may also execute program codes of the following steps: obtaining the number of virtual processors of the respective virtual machine and a total number of virtual processors created by the candidate host machine, an average utilization rate of virtual processors in each preset time segment, and the number of physical cores of the candidate host machine; obtaining a ratio between the number of virtual processors of the respective virtual machine and the total number of virtual processors created by the candidate host machine; obtaining a minimum value between the number of physical cores of the candidate host machine and the total number of virtual processors created by the candidate host machine; calculating a product of the ratio, the average utilization rate of virtual processors and the minimum; and determining the product as the processor resources of the respective virtual machine at the preset time segment.

In implementations, the processor(s) may also execute program codes of the following steps: the time period including a plurality of preset time segments; filtering and selecting candidate host machine(s) satisfying condition(s) from the candidate host machines, the condition(s) including a superimposition result of each preset time segment not exceeding available resource data of the host machine(s); and determining the candidates host machine(s) satisfying condition(s) as the target host machine corresponding to the virtual machine.

In implementations, the processor(s) may also execute program codes of the following steps: when multiple candidate host machines satisfying the condition(s) exist, obtaining a weight value corresponding to each resource data; weighting superposition result(s) with weight value(s) to obtain respective weighted result(s) corresponding to the candidate host machine(s) satisfying the condition(s); and determining a candidate host machine having a smallest weighted result as the target host machine corresponding to the virtual machine.

In implementations, the processor(s) may also execute program codes of the following steps: migrating the virtual machine to the target host machine corresponding to the virtual machine.

In implementations, the processor(s) may also execute program codes of the following steps: when the virtual machine is a newly created virtual machine, obtaining an identifier and a specification of the newly created virtual machine; searching for a target virtual machine with a same identifier and/or a same specification of the newly created virtual machine; and determining that a prediction result of the target virtual machine is a prediction result of the newly created virtual machine.

Using the embodiments of the present disclosure, by predicting and scheduling resource data used by a virtual machine in a next time period, and by obtaining currently used resource data and available resource data of candidate host machines, a determination is made to as which candidate host machine the virtual machine needs to be migrated to, i.e., a target host machine is determined. A host machine can thereby be selected more accurately for a virtual machine without requiring each host machine to reserve resources for respective peaks of each virtual machine. This reduces a waste of resources, and schedules and distributes virtual machines as uniform as possible on different host machines to achieve stable load balancing of physical machines.

Therefore, the foregoing embodiments of the present disclosure solves the technical problem that the host machine needs to reserve resources for respective peaks of each virtual machine in the existing technologies, which leads to a large waste of resources.

One of ordinary skill in the art can understand that the structure shown in FIG. 8 is only used for illustration, and the computer terminal can also be a smart phone (such as an Android phone, an iOS phone, etc.), a tablet computer, a handheld computer, and a mobile Internet device (Mobile Internet Devices, MID), a PAD, and other terminal devices. FIG. 8 does not limit the structure of the above electronic device. For example, the computer terminal may also include more or fewer components (such as a network interface, a display device, etc.) than those shown in FIG. 8, or have a configuration different from that shown in FIG. 8.

One of ordinary skill in the art can understand that all or part of the steps in various methods of the foregoing embodiments can be completed by instructing relevant hardware of a terminal device through a program. The program can be stored in a computer-readable storage medium, which may include a flash disk, read-only memory (Read-Only Memory, ROM), random access memory (Random Access Memory, RAM), a magnetic disk, or an optical disk, etc.

The embodiments of the present disclosure also provide a storage medium. In implementations, in the present embodiment, the storage medium may be used to store program codes executed by the virtual machine scheduling method provided in the embodiments.

In implementations, in the present embodiment, the storage medium may be located in any computer terminal in a computer terminal group in a computer network, or located in any mobile terminal in a mobile terminal group.

In implementations, in the present embodiment, the storage medium is configured to store program codes used for executing the following steps: predicting resource data required by a virtual machine in a next time period to obtain a prediction result, wherein the resource data includes at least one of the following: processor resources, a number of times of processor contention, a number of cache misses, and a utilization rate of power consumption; obtaining used resource data and available resource data of candidate host machines; adding the prediction result to used resource data of each candidate host machine to obtain a superimposition result of each candidate host machine; and separately comparing the superimposition result of each candidate host machine with available resource data of each host machine, and selecting a target host machine corresponding to the virtual machine from the candidate host machines.

Sequence numbers of the foregoing embodiments of the present disclosure are only used for description, and do not represent qualities of the embodiments.

In the foregoing embodiments of the present disclosure, the description of each embodiment has its own focus. For parts that are not described in detail in one embodiment, reference may be made to related descriptions of other embodiments.

In a number of embodiments provided in the present disclosure, it should be understood that the disclosed technical content can be implemented in other ways. The apparatus embodiments described above are only illustrative. For example, a division of units is only a division of logical functions. In practical implementations, other methods of division may exist. For example, multiple units or components may be combined or may be integrated into another system. Alternatively, some features can be ignored or not implemented. In addition, mutual coupling or direct coupling or communication connection that is displayed or discussed may be indirect coupling or communication connection through some interfaces, units or modules, and may be in electrical or other forms.

The units described as separate components may or may not be physically separated. The components displayed as units may or may not be physical units, i.e., may be located in one place, or may be distributed over multiple network units. Some or all of the units may be selected according to actual needs to achieve the objectives of the solutions of the embodiments.

In addition, functional units in various embodiments of the present disclosure may be integrated into a single processing unit. Alternatively, each unit may exist alone physically. Alternatively, two or more units may be integrated into one unit. The above-mentioned integrated unit can be realized in a form of hardware or software functional unit.

If being implemented in a form of a software functional unit and sold or used as an independent product, the integrated unit can be stored in a computer readable storage medium. Based on such understanding, the essence of the technical solutions of the present disclosure, or the part that contributes to the existing technologies, or all or part of the technical solutions can be embodied in a form of a software product. Such computer software product is stored in a storage medium, and includes a number of instructions to cause a computing device (which may be a personal computer, a server, or a network device, etc.) to execute all or part of the steps of the method in each embodiment of the present disclosure. The storage media include various types of media that are capable of storing program codes, such as a flash disk, read-only memory (ROM, Read-Only Memory), random access memory (RAM, Random Access Memory), a mobile hard disk, a magnetic disk, or an optical disk, etc.

The above represents only exemplary embodiments of the present disclosure. It should be pointed out that one of ordinary skill in the art can make a number of improvements and modifications without departing from the principles of the present disclosure. These improvements and modifications shall also be regarded to fall into the scope of protection of the present disclosure.

The present disclosure can be further understood using the following clauses.

Clause 1: A virtual machine scheduling method comprising: predicting resource data required by a virtual machine in a next time period to obtain a prediction result, wherein the resource data includes at least one of the following: processor resources, a number of times of processor contention, a number of cache misses, and a utilization rate of power consumption; obtaining used resource data and available resource data of candidate host machines; adding the prediction result to used resource data of each candidate host machine to obtain a superimposition result of each candidate host machine; and separately comparing the superimposition result of each candidate host machine with available resource data of each host machine, and selecting a target host machine corresponding to the virtual machine from the candidate host machines.

Clause 2: The method of Clause 1, wherein the time period comprises a plurality of time segments, and predicting the resource data required by the virtual machine in the next time period to obtain the prediction result comprises: obtaining a prediction model, wherein the prediction model is used to represent corresponding relationships between prediction results of virtual machines having different attribute parameters and preset time segments, the attribute parameters including identifications, specifications, and application types of the virtual machines; inputting attribute parameters of the virtual machine into the prediction model; and receiving a prediction result of the virtual machine that is outputted from the prediction model.

Clause 3: The method of Clause 2, wherein: before inputting the attribute parameters of the virtual machine to the prediction model, the method further comprises: obtaining a degree of confidence of the prediction model and a preset confidence threshold; entering the step of inputting the attribute parameters of the virtual machine into the prediction model if the degree of confidence of the prediction model is greater than or equal to the confidence threshold; and if the degree of confidence of the prediction model is less than the confidence threshold, predicting resource data required by the virtual machine in the next time period based on virtual processor resources and a virtual processor utilization rate of the virtual machine.

Clause 4: The method of Clause 2, wherein obtaining the prediction model comprises: obtaining sample data, wherein the sample data includes attribute information of a plurality of sample virtual machines and historical resource data of the sample virtual machines in a preset time segment; and obtaining the prediction model through model training.

Clause 5: The method of Clause 4, wherein obtaining the resource data of the sample virtual machines in the preset time segment comprises: collecting average resource data of multiple virtual processors of the virtual machines according to a preset sampling time, wherein the preset time segment includes multiple sampling times; and determining average resource data that is the maximum in the preset time segment as the historical resource data of the preset time segment.

Clause 6: The method of Clause 1, wherein the time period comprises a plurality of time segments, and obtaining the used resource data of the candidate host machines when the resource data is the processor resources comprises: obtaining resources used by each virtual machine running on a candidate host machine in a preset time segment; and determining a sum of the resources used by each virtual machine in the preset time segment as used processor resources of the host machine in the preset time segment.

Clause 7: The method of Clause 6, wherein obtaining the available resource data of the candidate host machines comprises: obtaining total processor resources of a host machine and a preset utilization threshold, wherein the total processor resources of the host machine are a product of the number of physical cores of the host machine and a preset constant; and determining the product of the total processor resources of the host machine and the preset utilization threshold as the available resource data of the candidate host machine.

Clause 8: The method of Clause 6, wherein obtaining the resources used by each virtual machine running on the candidate host machine in the preset time segment comprises: obtaining the number of virtual processors of the respective virtual machine and a total number of virtual processors created by the candidate host machine, an average utilization rate of virtual processors in each preset time segment, and the number of physical cores of the candidate host machine; obtaining a ratio between the number of virtual processors of the respective virtual machine and the total number of virtual processors created by the candidate host machine; obtaining a minimum value between the number of physical cores of the candidate host machine and the total number of virtual processors created by the candidate host machine; calculating a product of the ratio, the average utilization rate of virtual processors and the minimum; and determining the product as the processor resources of the respective virtual machine at the preset time segment.

Clause 9: The method of Clause 1, wherein the time period comprises a plurality of preset time segments, and separately comparing the superimposition result of each candidate host machine with the available resource data of each host machine, and selecting the target host machine corresponding to the virtual machine from the candidate host machines comprises: filtering and selecting candidate host machine(s) satisfying condition(s) from the candidate host machines, the condition(s) including a superimposition result of each preset time segment not exceeding available resource data of the host machine(s); and determining the candidates host machine(s) satisfying condition(s) as the target host machine corresponding to the virtual machine.

Clause 10: The method of Clause 9, wherein determining the candidates host machine(s) satisfying condition(s) as the host machine corresponding to the virtual machine when multiple candidate host machines satisfying the condition(s) exist, comprise: obtaining a weight value corresponding to each resource data; weighting superposition result(s) with weight value(s) to obtain respective weighted result(s) corresponding to the candidate host machine(s) satisfying the condition(s); and determining a candidate host machine having a smallest weighted result as the target host machine corresponding to the virtual machine.

Clause 11: The method of Clause 1, wherein: after separately comparing the superimposition result of each candidate host machine with the available resource data of each host machine, and selecting the target host machine corresponding to the virtual machine from the candidate host machines, the method further comprises: migrating the virtual machine to the target host machine corresponding to the virtual machine.

Clause 12: The method of Clause 2, wherein predicting the resource data required by the virtual machine in the next time period to obtain the prediction result when the virtual machine is a newly created virtual machine, comprises: obtaining an identifier and a specification of the newly created virtual machine; searching for a target virtual machine with a same identifier and/or a same specification of the newly created virtual machine; and determining that a prediction result of the target virtual machine is a prediction result of the newly created virtual machine.

Clause 13: A virtual machine scheduling method comprising: predicting processor resources required by a virtual machine in a next time period to obtain a prediction result; obtaining used processor resources and available processor resources of candidate host machines; adding the prediction result to used processor resources of each candidate host machine to obtain a superimposition result of each candidate host machine; and separately comparing the superimposition result of each candidate host machine with available processor resources of each candidate host machine, and selecting a target host machine corresponding to the virtual machine from the candidate host machines.

Clause 14: The method of Clause 13, wherein obtaining the available processor resources of the candidate host machines comprises: obtaining a preset constant, respective numbers of physical cores of the host machines, and a preset threshold, wherein the preset threshold is less than one; and determining respective products of the preset constant, the respective numbers of physical cores of the host machines and the preset threshold as the available processor resources of the host machines.

Clause 15: The method of Clause 14, wherein the time period includes a plurality of preset time segments, and obtaining the used processor resources of the candidate host machines comprises: obtaining processor resources of each virtual machine running on a candidate host machine in a preset time segment; and determining a sum of the processor resources of each virtual machine as used processor resources of the candidate host machine in the preset time segment.

Clause 16: The method of Clause 15, wherein obtaining the processor resources of each virtual machine running on the candidate host machine for the preset time segment comprises: obtaining the number of virtual processors of the respective virtual machine and a total number of virtual processors created by the candidate host machine, an average utilization rate of virtual processors in each preset time segment, and the number of physical cores of the candidate host machine; obtaining a ratio between the number of virtual processors of the respective virtual machine and the total number of virtual processors created by the candidate host machine; obtaining a minimum value between the number of physical cores of the candidate host machine and the total number of virtual processors created by the candidate host machine; calculating a product of the ratio, the average utilization rate of virtual processors and the minimum; and determining the product as the processor resources of the respective virtual machine at the preset time segment.

Clause 17: A virtual machine scheduling apparatus comprising: a prediction module configured to predict resource data required by a virtual machine in a next time period to obtain a prediction result, wherein the resource data includes at least one of the following: processor resources, a number of times of processor contentions, a number of cache misses, and a utilization rate of power consumption; an acquisition module configured to obtain used resource data and available resource data of candidate host machines; a superimposition module configured to add the prediction result to resource data of each candidate host machine to obtain a superimposition result of each candidate host machine; and a comparison module configured to separately compare the superimposition result of each candidate host machine with available resource data of each host machine, and select a target host machine corresponding to the virtual machine from the candidate host machines.

Clause 18: A virtual machine scheduling apparatus comprising: a prediction module configured to predict processor resources required by a virtual machine in a next time period to obtain a prediction result; an acquisition module configured to obtain used processor resources and available processor resources of candidate host machines; a superposition module configured to add the prediction result to used processor resources of each candidate host machine to obtain a superimposition result of each candidate host machine; and a comparison module configured to compare the superimposition result of each candidate host machine with available processor resources of each candidate host machine, and select a target host machine corresponding to the virtual machine from the candidate host machines.

Clause 19: A storage medium comprising a stored program, wherein a device where the storage medium is located is controlled to perform the following steps when the program is running: predicting resource data required by a virtual machine in a next time period to obtain a prediction result, wherein the resource data includes at least one of the following: processor resources, a number of times of processor contention, a number of cache misses, and a utilization rate of power consumption; obtaining used resource data and available resource data of candidate host machines; adding the prediction result to used resource data of each candidate host machine to obtain a superimposition result of each candidate host machine; and separately comparing the superimposition result of each candidate host machine with available resource data of each host machine, and selecting a target host machine corresponding to the virtual machine from the candidate host machines.

Clause 20: A processor being used to run a program, wherein the following steps are executed when the program is running: predicting resource data required by a virtual machine in a next time period to obtain a prediction result, wherein the resource data includes at least one of the following: processor resources, a number of times of processor contention, a number of cache misses, and a utilization rate of power consumption; obtaining used resource data and available resource data of candidate host machines; adding the prediction result to used resource data of each candidate host machine to obtain a superimposition result of each candidate host machine; and separately comparing the superimposition result of each candidate host machine with available resource data of each host machine, and selecting a target host machine corresponding to the virtual machine from the candidate host machines.

Clause 21: A system comprising: a processor; and a memory coupled to the processor, and configured to provide the processor with instructions for processing the following processing steps: predicting resource data required by a virtual machine in a next time period to obtain a prediction result, wherein the resource data includes at least one of the following: processor resources, a number of times of processor contention, a number of cache misses, and a utilization rate of power consumption; obtaining used resource data and available resource data of candidate host machines; adding the prediction result to used resource data of each candidate host machine to obtain a superimposition result of each candidate host machine; and separately comparing the superimposition result of each candidate host machine with available resource data of each host machine, and selecting a target host machine corresponding to the virtual machine from the candidate host machines.

What is claimed is:

1. A method implemented by one or more computing devices, the method comprising:
identifying a virtual machine for migration;
projecting a candidate host machine of a plurality of candidate host machines to migrate the virtual machine, the projecting comprising:
dividing a previous time period into a plurality of past time segments;
obtaining used resource data and available resource data of plurality of candidate host machines, the obtaining comprising:
for each virtual machine currently running on each candidate host machine of the plurality of candidate host machines:
for each of the plurality of past time segments:
obtaining a number of virtual processors of a respective virtual machine, a total number of virtual processors created by a respective candidate host machine, an average utilization rate of the number of virtual processors of the respective virtual machine, and a number of physical cores of the respective candidate host machine associated with a respective past time segment;
obtaining a ratio between the number of virtual processors of the respective virtual machine and the total number of virtual processors created by the respective candidate host machine;
calculating a minimum between the number of physical cores of the respective candidate host machine and the total number of virtual processors created by the respective candidate host machine;
calculating a product based on the ratio, the average utilization rate and the minimum; and
saving the product as used resource data for the respective virtual machine;
dividing a preset time period for running the identified virtual machine into a plurality of preset time segments, the preset time period being a future time period;
in each of the plurality of preset time segments, predicting respective resource data required by the identified virtual machine to obtain a prediction result;
subsequent to the obtaining and the predicting, for each candidate host machine of the plurality of candidate host machines in each of the plurality of preset time segments:
for each preset time segment, adding the predicted resource data required by the identified virtual machine in a respective preset time segment, to used resource data of all virtual machines on a respective candidate host machine, in a respective preset time segment to obtain a superimposition result of the respective candidate host machine; and
selecting a target host machine as a migration destination for the identified virtual machine from the plurality of candidate host machines, the selecting comprising:
for each candidate host machine of the plurality of candidate host machines in each of the plurality of past time segments:
determining an available resource data of a respective candidate host machine;
determining whether a superimposition result of the respective candidate host machine exceeds available resource data of the respective candidate host machine in a respective past time segment; and
selecting a candidate host machine satisfying at least one condition from the plurality of candidate host machines, wherein the at least one condition includes that a superimposition result of the selected candidate host machine does not exceed the available resource data of the selected candidate host machine for each past time segment of the plurality of past time segments; and
migrating the identified virtual machine to the selected candidate host machine.

2. The method of claim 1, wherein the predicting comprises:
inputting attribute parameters of the identified virtual machine into a prediction model; and
receiving the prediction result of the identified virtual machine that is outputted from the prediction model, wherein the prediction model is used to represent corresponding relationships between prediction results of virtual machines having different attribute parameters and different preset time segments, the different attribute parameters including identifications, specifications, and application types of the virtual machines.

3. The method of claim 2, wherein: before inputting the attribute parameters of the identified virtual machine to the prediction model, the method further comprises:
obtaining a degree of confidence of the prediction model and a preset confidence threshold.

4. The method of claim 2, further comprising obtaining the prediction model, wherein obtaining the prediction model comprises:
obtaining sample data, wherein the sample data includes attribute information of a plurality of sample virtual machines and historical resource data of the plurality of sample virtual machines in a predetermined time segment; and
obtaining the prediction model through model training.

5. The method of claim 4, wherein obtaining the resource data of the plurality of sample virtual machines in the predetermined time segment comprises:
collecting average resource data of multiple virtual processors of the plurality of sample virtual machines according to a preset sampling time, wherein the predetermined time segment includes multiple sampling times; and
determining average resource data that is a maximum in the predetermined time segment as the historical resource data of the plurality of sample virtual machines in the predetermined time segment.

6. The method of claim 1, wherein: when multiple candidate host machines satisfying the at least one condition exist, selecting the candidate host machine satisfying the at least one condition comprises:
obtaining a weight value corresponding to each resource data;
weighting multiple superposition results with multiple weight values to obtain respective weighted results corresponding to the multiple candidate host machines satisfying the at least one condition; and determining a candidate host machine having a smallest weighted result as the selected candidate host machine.

7. The method of claim 1, wherein the virtual machine is a newly created virtual machine, and predicting the respective resource data required by the identified virtual machine to obtain the prediction result comprises:

obtaining an identifier and a specification of the newly created virtual machine;

searching for a target virtual machine with a same identifier and/or a same specification of the newly created virtual machine; and determining that a prediction result of the target virtual machine is a prediction result of the newly created virtual machine.

8. One or more non-transitory computer readable media storing executable instructions that, when executed by one or more processors, cause the one or more processors to perform acts comprising:

identifying a virtual machine for migration;

projecting a candidate host machine of a plurality of candidate host machines to migrate the virtual machine, the projecting comprising:

dividing a previous time period into a plurality of past time segments; obtaining used resource data and available resource data of plurality of candidate host machines, the obtaining comprising:

for each virtual machine currently running on each candidate host machine of the plurality of candidate host machines:

for each of the plurality of past time segments:

obtaining a number of virtual processors of a respective virtual machine, a total number of virtual processors created by a respective candidate host machine, an average utilization rate of the number of virtual processors of the respective virtual machine, and a number of physical cores of the respective candidate host machine associated with a respective past time segment;

obtaining a ratio between the number of virtual processors of the respective virtual machine and the total number of virtual processors created by the respective candidate host machine;

calculating a minimum between the number of physical cores of the respective candidate host machine and the total number of virtual processors created by the respective candidate host machine;

calculating a product based on the ratio, the average utilization rate and the minimum; and saving the product as used resource data for the respective virtual machine;

dividing a preset time period for running the identified virtual machine into a plurality of preset time segments, the preset time period being a future time period;

in each of the plurality of preset time segments, predicting respective resource data required by the identified virtual machine to obtain a prediction result;

subsequent to the obtaining and the predicting, for each candidate host machine of the plurality of candidate host machines in each of the plurality of preset time segments:

for each preset time segment, adding the predicted resource data required by the identified virtual machine in a respective preset time segment, to used resource data of all virtual machines on a respective candidate host machine, in a respective preset time segment to obtain a superimposition result of the respective candidate host machine; and selecting a target host machine as a migration destination for the identified virtual machine from the plurality of candidate host machines, the selecting comprising:

for each candidate host machine of the plurality of candidate host machines in each of the plurality of past time segments:

determining an available resource data of a respective candidate host machine;

determining whether a superimposition result of the respective candidate host machine exceeds available resource data of the respective candidate host machine in a respective past time segment; and selecting a candidate host machine satisfying at least one condition from the plurality of candidate host machines, wherein the at least one condition includes that a superimposition result of the selected candidate host machine does not exceed the available resource data of the selected candidate host machine for each past time segment of the plurality of past time segments; and migrating the identified virtual machine to the selected candidate host machine.

9. The one or more non-transitory computer readable media of claim 8, wherein the predicting comprises:

inputting attribute parameters of the identified virtual machine into a prediction model; and receiving the prediction result of the identified virtual machine that is outputted from the prediction model, wherein the prediction model is used to represent corresponding relationships between prediction results of virtual machines having different attribute parameters and different preset time segments, the different attribute parameters including identifications, specifications, and application types of the virtual machines.

10. The one or more non-transitory computer readable media of claim 9, wherein: before inputting the attribute parameters of the identified virtual machine to the prediction model, the acts further comprise:

obtaining a degree of confidence of the prediction model and a preset confidence threshold.

11. The one or more non-transitory computer readable media of claim 8, the acts further comprising obtaining the prediction model, wherein obtaining the prediction model comprises:

obtaining sample data, wherein the sample data includes attribute information of a plurality of sample virtual machines and historical resource data of the plurality of sample virtual machines in a predetermined time segment; and obtaining the prediction model through model training.

12. The one or more non-transitory computer readable media of claim 11, wherein obtaining the resource data of the plurality of sample virtual machines in the predetermined time segment comprises:

collecting average resource data of multiple virtual processors of the plurality of sample virtual machines according to a preset sampling time, wherein the predetermined time segment includes multiple sampling times; and
determining average resource data that is a maximum in the predetermined time segment as the historical resource data of the plurality of sample virtual machines in the predetermined time segment.

13. The one or more non-transitory computer readable media of claim 8, wherein: when multiple candidate host machines satisfying the at least one condition exist, selecting the candidate host machine satisfying the at least one condition comprises:
obtaining a weight value corresponding to each resource data;
weighting multiple superposition results with multiple weight values to obtain respective weighted results corresponding to the multiple candidate host machines satisfying the at least one condition; and
determining a candidate host machine having a smallest weighted result as the selected candidate host machine.

14. The one or more non-transitory computer readable media of claim 8, wherein the virtual machine is a newly created virtual machine, and predicting the respective resource data required by the identified virtual machine to obtain the prediction result comprises:
obtaining an identifier and a specification of the newly created virtual machine;
searching for a target virtual machine with a same identifier and/or a same specification of the newly created virtual machine; and
determining that a prediction result of the target virtual machine is a prediction result of the newly created virtual machine.

15. An apparatus comprising:
one or more processors;
memory storing executable instructions that, when executed by the one or more processors, cause the one or more processors to perform acts comprising:
identifying a virtual machine for migration;
projecting a candidate host machine of a plurality of candidate host machines to migrate the virtual machine, the projecting comprising:
dividing a previous time period into a plurality of past time segments;
obtaining used resource data and available resource data of plurality of candidate host machines, the obtaining comprising:
for each virtual machine currently running on each candidate host machine of the plurality of candidate host machines:
for each of the plurality of past time segments:
obtaining a number of virtual processors of a respective virtual machine, a total number of virtual processors created by a respective candidate host machine, an average utilization rate of the number of virtual processors of the respective virtual machine, and a number of physical cores of the respective candidate host machine associated with a respective past time segment;
obtaining a ratio between the number of virtual processors of the respective virtual machine and the total number of virtual processors created by the respective candidate host machine;
calculating a minimum between the number of physical cores of the respective candidate host machine and the total number of virtual processors created by the respective candidate host machine;
calculating a product based on the ratio, the average utilization rate and the minimum; and
saving the product as used resource data for the respective virtual machine;
dividing a preset time period for running the identified virtual machine into a plurality of preset time segments, the preset time period being a future time period;
in each of the plurality of preset time segments, predicting respective resource data required by the identified virtual machine to obtain a prediction result;
subsequent to the obtaining and the predicting, for each candidate host machine of the plurality of candidate host machines in each of the plurality of preset time segments:
for each preset time segment, adding the predicted resource data required by the identified virtual machine in a respective preset time segment, to used resource data of all virtual machines on a respective candidate host machine, in a respective preset time segment to obtain a superimposition result of the respective candidate host machine; and
selecting a target host machine as a migration destination for the identified virtual machine from the plurality of candidate host machines, the selecting comprising:
for each candidate host machine of the plurality of candidate host machines in each of the plurality of past time segments:
determining an available resource data of a respective candidate host machine;
determining whether a superimposition result of the respective candidate host machine exceeds available resource data of the respective candidate host machine in a respective past time segment; and
selecting a candidate host machine satisfying at least one condition from the plurality of candidate host machines, wherein the at least one condition includes that a superimposition result of the selected candidate host machine does not exceed the available resource data of the selected candidate host machine for each past time segment of the plurality of past time segments; and
migrating the identified virtual machine to the selected candidate host machine.

16. The apparatus of claim 15, wherein the predicting comprises:
inputting attribute parameters of the identified virtual machine into a prediction model; and
receiving the prediction result of the identified virtual machine that is outputted from the prediction model, wherein the prediction model is used to represent corresponding relationships between prediction results of virtual machines having different attribute parameters and different preset time segments, the different attribute parameters including identifications, specifications, and application types of the virtual machines.

17. The apparatus of claim 16, wherein: before inputting the attribute parameters of the identified virtual machine to the prediction model, the acts further comprise:

obtaining a degree of confidence of the prediction model and a preset confidence threshold.

18. The apparatus of claim 15, the acts further comprising obtaining the prediction model, wherein obtaining the prediction model comprises:
   obtaining sample data, wherein the sample data includes attribute information of a plurality of sample virtual machines and historical resource data of the plurality of sample virtual machines in a predetermined time segment; and
   obtaining the prediction model through model training.

19. The apparatus of claim 18, wherein obtaining the resource data of the plurality of sample virtual machines in the predetermined time segment comprises:
   collecting average resource data of multiple virtual processors of the plurality of sample virtual machines according to a preset sampling time, wherein the predetermined time segment includes multiple sampling times; and
   determining average resource data that is a maximum in the predetermined time segment as the historical resource data of the plurality of sample virtual machines in the predetermined time segment.

20. The apparatus of claim 15, wherein: when multiple candidate host machines satisfying the at least one condition exist, selecting the candidate host machine satisfying the at least one condition comprises:
   obtaining a weight value corresponding to each resource data;
   weighting multiple superposition results with multiple weight values to obtain respective weighted results corresponding to the multiple candidate host machines satisfying the at least one condition; and
   determining a candidate host machine having a smallest weighted result as the selected candidate host machine.

* * * * *